US012665768B2

(12) United States Patent
Watson et al.

(10) Patent No.: US 12,665,768 B2
(45) Date of Patent: Jun. 23, 2026

(54) OBLIVIOUS TRANSFER FROM KEY ENCAPSULATION MECHANISMS

(71) Applicant: VISA INTERNATIONAL SERVICE ASSOCIATION, San Francisco, CA (US)

(72) Inventors: Gaven Watson, Palo Alto, CA (US); Daniel Masny, Sunnyvale, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 132 days.

(21) Appl. No.: 18/558,722

(22) PCT Filed: May 3, 2022

(86) PCT No.: PCT/US2022/027514
§ 371 (c)(1),
(2) Date: Nov. 2, 2023

(87) PCT Pub. No.: WO2022/235700
PCT Pub. Date: Nov. 10, 2022

(65) Prior Publication Data
US 2024/0235842 A1      Jul. 11, 2024

Related U.S. Application Data

(60) Provisional application No. 63/183,565, filed on May 3, 2021.

(51) Int. Cl.
*H04L 9/32* (2006.01)
*H04L 9/08* (2006.01)

(52) U.S. Cl.
CPC .......... *H04L 9/3239* (2013.01); *H04L 9/0861* (2013.01)

(58) Field of Classification Search
CPC ..... H04L 9/30; H04L 9/08; H04L 9/06; H04L 9/0861; H04L 9/3239; H04L 9/32; H04L 9/40; H04L 63/08; G06F 21/60
(Continued)

(56) References Cited

U.S. PATENT DOCUMENTS 5,606,617 A * 2/1997 Brands .................. H04L 9/3263
380/30
8,539,220 B2 * 9/2013 Raykova ............. H04L 63/0428
380/278
(Continued)

OTHER PUBLICATIONS

Hsu et al., "Oblivious Transfer Protocols Based on Commutative Encryption", 9th IFIP International Conference on New Technologies, Mobility and Security (NTMS), Feb. 28, 2018, 5 pages.
(Continued)

*Primary Examiner* — Sargon N Nano
(74) *Attorney, Agent, or Firm* — Kilpatrick Townsend & Stockton LLP

(57) ABSTRACT

Embodiments can perform efficient OT (oblivious transfer) protocols to efficiently establish OT correlations that could be used for an MPC protocol. The present embodiments relate to a non-interactive OT (NIOT) protocol using a key encapsulation mechanism (KEM). Two OT protocols are non-interactive OTs, in which a sender generates private, public key pair (pk, sk) that is independent of its input or generated OT correlations. The two OT protocols use a cryptographic hash function and a one-way secure dense key encapsulation mechanism (KEM).

20 Claims, 17 Drawing Sheets

600

(58) Field of Classification Search
USPC .......................................................... 380/225
See application file for complete search history.

(56) References Cited

U.S. PATENT DOCUMENTS

| | | | | |
|---|---|---|---|---|
| 8,578,165 | B2 * | 11/2013 | Struik | ................... H04L 9/0844 |
| | | | | 713/171 |
| 8,978,118 | B2 | 3/2015 | Aichroth et al. | |
| 9,680,640 | B2 * | 6/2017 | Hughes | ................. H04L 9/3226 |
| 10,630,483 | B2 * | 4/2020 | Riley | .................... H04W 12/06 |
| 10,637,659 | B1 * | 4/2020 | Li | ........................... G06F 21/64 |
| 10,791,123 | B2 * | 9/2020 | Gvili | ..................... H04L 63/123 |
| 11,190,496 | B2 | 11/2021 | Masny et al. | |
| 11,223,482 | B2 * | 1/2022 | Kroneisen | ............. H04L 9/3242 |
| 11,431,498 | B2 * | 8/2022 | Goncalves | ............ H04L 9/0869 |
| 12,149,515 | B2 * | 11/2024 | Ateniese | ............... H04L 9/3226 |
| 12,278,804 | B2 * | 4/2025 | Ocegueda | ........... H04L 63/0428 |
| 12,445,286 | B2 * | 10/2025 | Chen | ..................... H04L 9/3226 |
| 2013/0216044 | A1 | 8/2013 | Gentry et al. | |
| 2016/0013936 | A1 * | 1/2016 | Hughes | ............... H04W 12/041 |
| | | | | 380/279 |
| 2017/0149796 | A1 * | 5/2017 | Gvili | ................... H04L 63/0428 |
| 2017/0346837 | A1 * | 11/2017 | Vaswani | ............... H04L 63/102 |
| 2021/0021606 | A1 | 1/2021 | Gvili | |
| 2022/0021526 | A1 * | 1/2022 | Dugardin | .............. H04L 9/3073 |
| 2023/0336567 | A1 * | 10/2023 | Gvili | ................... H04L 63/0428 |

OTHER PUBLICATIONS

Jannati et al., "An Oblivious Transfer Protocol Based on Elgamal Encryption for Preserving Location Privacy", Wireless Personal Communications Volume, vol. 97, Jul. 31, 2017, pp. 3113-3123.

Lemus et al., "Generation and Distribution of Quantum Oblivious Keys for Secure Multiparty Computation", Application Sciences, vol. 10, Jun. 12, 2020, pp. 1-11.

Masny et al., "Endemic Oblivious Transfer", CCS '19: Proceedings of the 2019 ACM SIGSAC Conference on Computer and Communications Security, Nov. 15, 2019, pp. 309-326.

Application No. PCT/US2022/027514 , International Search Report and Written Opinion, Mailed on Aug. 19, 2022, 12 pages.

Application No. EP22799449.8 , Extended European Search Report, Mailed on Sep. 25, 2024, 11 pages.

Masny et al., "A PKI-based Framework for Establishing Efficient MPC Channels", Proceedings of the 21th ACM International Conference on Intelligent Virtual Agents, XP058660873, Nov. 15-19, 2021, pp. 1961-1980.

* cited by examiner $\mathcal{F}_{NIOT}$ :

Figure 1:
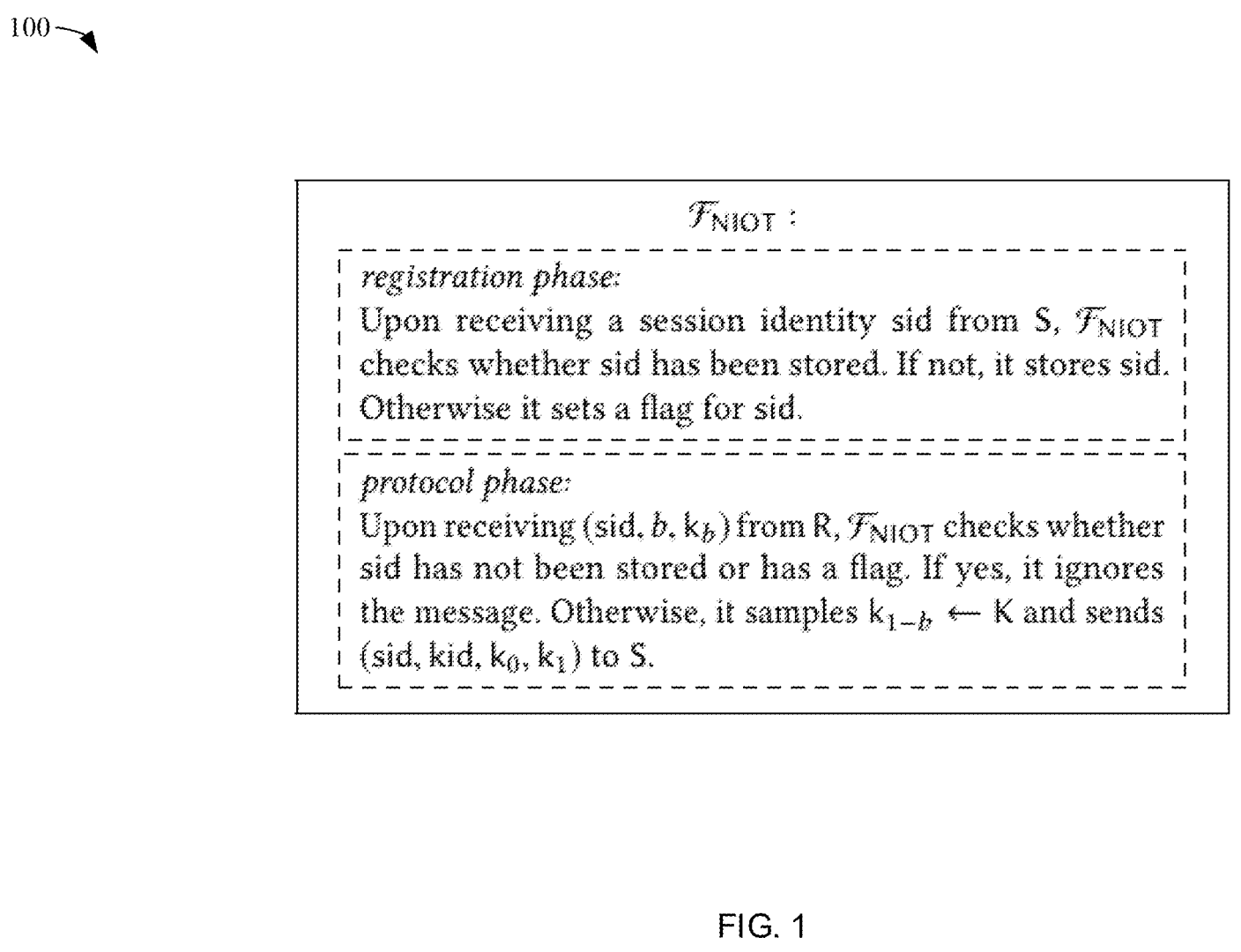

*registration phase:*
Upon receiving a session identity sid from S, $\mathcal{F}_{NIOT}$ checks whether sid has been stored. If not, it stores sid. Otherwise it sets a flag for sid.

*protocol phase:*
Upon receiving $(sid, b, k_b)$ from R, $\mathcal{F}_{NIOT}$ checks whether sid has not been stored or has a flag. If yes, it ignores the message. Otherwise, it samples $k_{1-b} \leftarrow K$ and sends $(sid, kid, k_0, k_1)$ to S.

S602 — GENERATE PRIVATE/PUBLIC KEY PAIR (SK, PK)

S606 — RECEIVE A PAIR OF RECEIVER VALUES FROM THE RECEIVER

S608 — GENERATE A FIRST SENDER VALUE

S609 — GENERATE A SECOND SENDER VALUE

S610 — DETERMINE AN ENCAPSULATED KEY ($K_0$)

S611 — DETERMINE AN ENCAPSULATED KEY ($K_1$)

S612 — USE THE ENCAPSULATED KEY $K_0$ AND THE ENCAPSULATED KEY $K_1$ TO PERFORM MULTI-PARTY COMPUTATIONS

700

S704 — RECEIVE A PUBLIC KEY (PK) FROM A SENDER

S706 — GENERATE A CIPHERTEXT ($CT_B$)

S708 — GENERATE A PAIR OF RECEIVER VALUES

S710 — PROVIDE THE PAIR OF RECEIVER VALUES TO THE SENDER

S712 — USE THE ENCAPUSLATED KEY ($K_B$) TO PERFORM MULTI-PARTY COMPUTATIONS

800

$$\overline{\mathcal{F}_{bb}}:$$

*report query:*
Upon receiving a message (report, $v$) from party $P$, record $(P, v)$ iff $P$ does not have a record and no record containing $v$ exists.

*retrieve query:*
Upon receiving a message (retrieve, $P$), look up and reply with $(P, v)$, where $v = \perp$ when there is no record for $P$.

$$\overline{\mathcal{F}}_{cert} :$$

*certify message:*
Upon receiving a message (sid, mid, m) from party $P$, query (retrieve, $P$) to $\overline{\mathcal{F}}_{bb}$ for receiving $(P, v)$. If $v = \perp$, ignore the query. Otherwise send $(v, sid, mid, m)$ to $\mathcal{A}$ and receive $\sigma$. Record $(v, m, \sigma, 1)$ iff $(v, m, \sigma, 0)$ has not been recorded and output $\sigma$ to $P$. Otherwise, output error.

*verify message:*
Upon receiving a message (sid, mid, m, $\sigma$, $P'$) from party $P$, query (retrieve, $P'$) to $\overline{\mathcal{F}}_{bb}$ for receiving $(P', v)$. If $v = \perp$, ignore the query. Otherwise send $(v, sid, mid, m, \sigma, P')$ to $\mathcal{A}$. Look up whether $(v, m, \sigma, b)$ has been recorded and output $b$. If not and $P'$ is corrupt, query it for $b$, record $(v, m, \sigma, b)$ and output $b$. Otherwise, record $(v, m, \sigma, 0)$ and output 0.

$$\overline{\mathcal{F}}_{cs}:$$

$\overline{\mathcal{F}}_{cs}$ runs with two parties $P_v$ and $P_c$, where $P_c$ can certify its messages and $P_v$ can verify the certificates.

*start certified session:*
Upon receiving a message $(sid, P_c, w)$ from party $P_v$, query $(\texttt{retrieve}, P_c)$ to $\overline{\mathcal{F}}_{bb}$ for receiving $(P_c, v)$. If $v = \perp$, ignore the query. Send $(sid, P_v, P_c, w)$ to $\mathcal{A}$ and if he does not interrupt and no record that contains $v$, $w$ exists, record $(v, w, P_v)$.

*certify message:*
Upon receiving a message $(sid, mid, m, P'_c, P'_v)$ from a party $P$, lookup $(P'_c, v)$ from $\overline{\mathcal{F}}_{bb}$ and $(v, w, P'_v)$. If there is no $w$ with record $(v, w, P')$ or $P \notin (P'_v, P'_c)$, ignore the query. Otherwise send $(sid, mid, m, v, w, P'_c, P'_v)$ to $\mathcal{A}$ and receive $\sigma$. Record $(v, w, m, \sigma, 1)$ iff $(v, w, m, \sigma, 0)$ has not been recorded and output $\sigma$ to $P_c$. Otherwise, output error.

*verify message:*
Upon receiving a message $(sid, mid, m, \sigma, P'_c, P'_v)$ from a party $P$, lookup lookup $(P'_c, v)$ from $\overline{\mathcal{F}}_{bb}$ and $(v, w, P'_v)$. If there is no $w$ with record $(v, w, P')$ or $P \notin (P'_v, P'_c)$, ignore the query. Otherwise, send $(sid, mid, m, \sigma, P'_c, P'_v)$ to $\mathcal{A}$. Look up whether $(v, w, m, \sigma, b)$ has been recorded and output $b$. If $P'_c$ or $P'_v$ is corrupt, query it for $b$, record $(v, w, m, \sigma, b)$ and output $b$. Otherwise, record $(v, w, m, \sigma, 0)$ and output 0.

Figure 11:
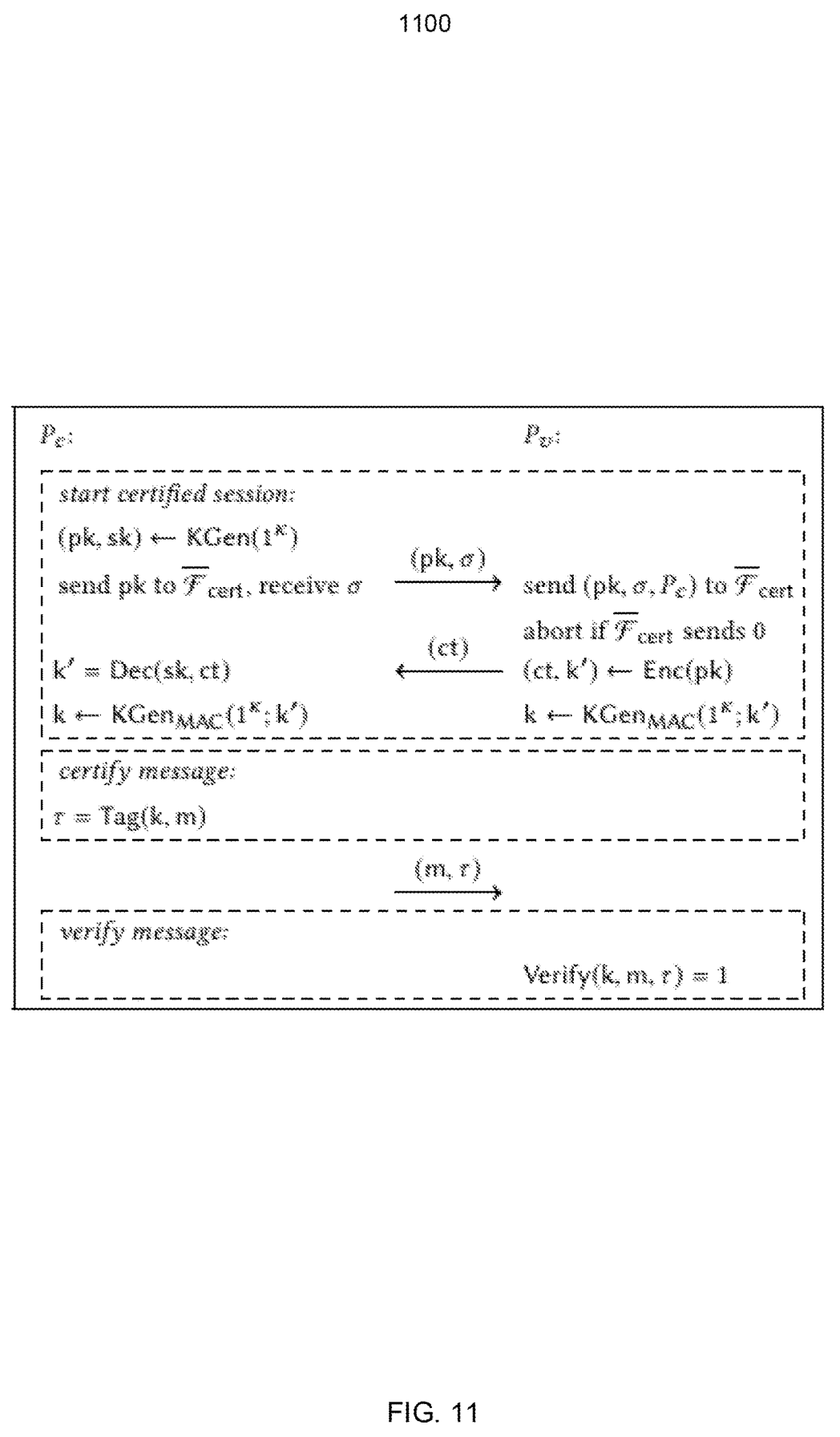

start certified session:

$(pk, sk) \leftarrow KGen(1^{\kappa})$ send $pk$ to $\overline{\mathcal{F}}_{cert}$, receive $\sigma$    $\xrightarrow{(pk, \sigma)}$    send $(pk, \sigma, P_C)$ to $\overline{\mathcal{F}}_{cert}$ abort if $\overline{\mathcal{F}}_{cert}$ sends 0

$k' = Dec(sk, ct)$    $\xleftarrow{(ct)}$    $(ct, k') \leftarrow Enc(pk)$ $k \leftarrow KGen_{MAC}(1^{\kappa}; k')$        $k \leftarrow KGen_{MAC}(1^{\kappa}; k')$ certify message:

$\tau = Tag(k, m)$ $\xrightarrow{(m, \tau)}$ verify message:

$Verify(k, m, \tau) = 1$

Figure 12:
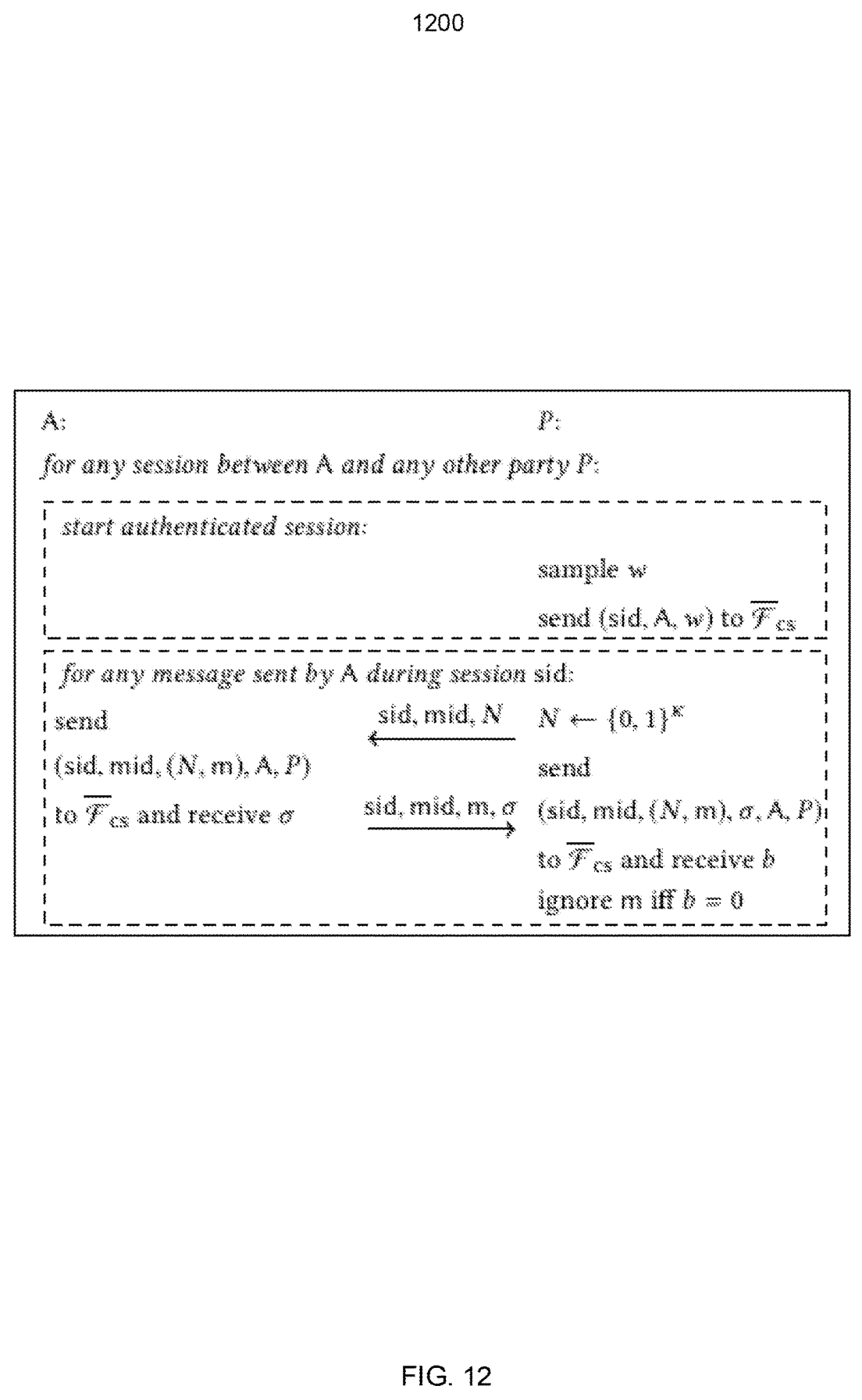

*for any session between A and any other party P:*

---
| *start authenticated session:*                                          |
|                                                                         |
|                                         sample w                        |
|                                         send (sid, A, w) to $\overline{\mathcal{F}}_{cs}$ |
---

---
| *for any message sent by A during session sid:*                          |
| send                        sid, mid, $N$        $N \leftarrow \{0, 1\}^{\kappa}$ |
| (sid, mid, $(N, m)$, A, P)   $\longleftarrow$     send                    |
| to $\overline{\mathcal{F}}_{cs}$ and receive $\sigma$   sid, mid, m, $\sigma$   (sid, mid, $(N, m)$, $\sigma$, A, P) |
|                             $\longrightarrow$     to $\overline{\mathcal{F}}_{cs}$ and receive $b$ |
|                                                  ignore m iff $b = 0$    |
---

Figure 13:
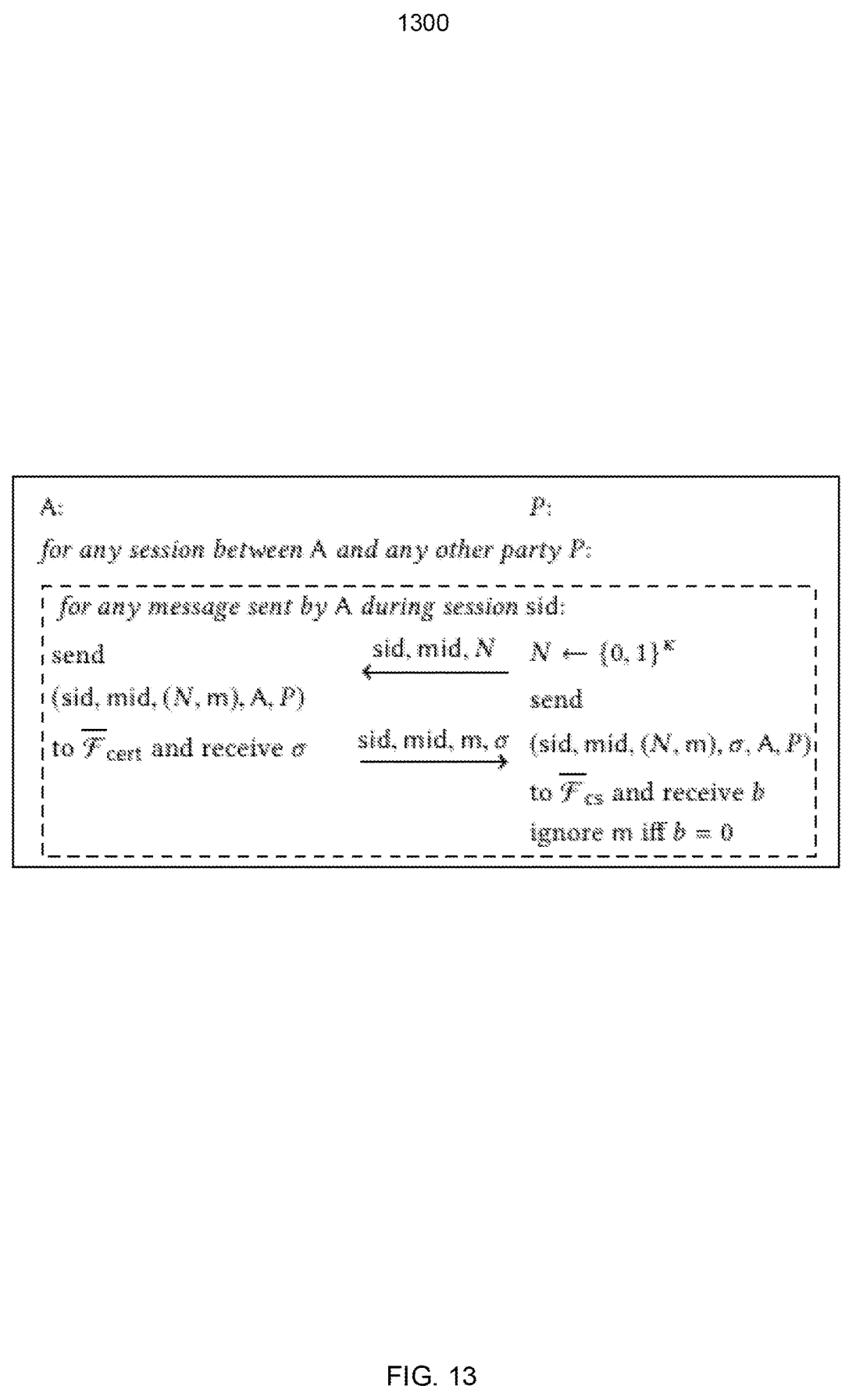

*for any session between A and any other party P:*

*for any message sent by A during session sid:* send $\xleftarrow{\text{sid, mid, } N}$ $N \leftarrow \{0, 1\}^\kappa$ $(sid, mid, (N, m), A, P)$ send to $\overline{\mathcal{F}}_{cert}$ and receive $\sigma$ $\xrightarrow{\text{sid, mid, m, } \sigma}$ $(sid, mid, (N, m), \sigma, A, P)$ to $\overline{\mathcal{F}}_{cs}$ and receive $b$ ignore m iff $b = 0$

Figure 14:
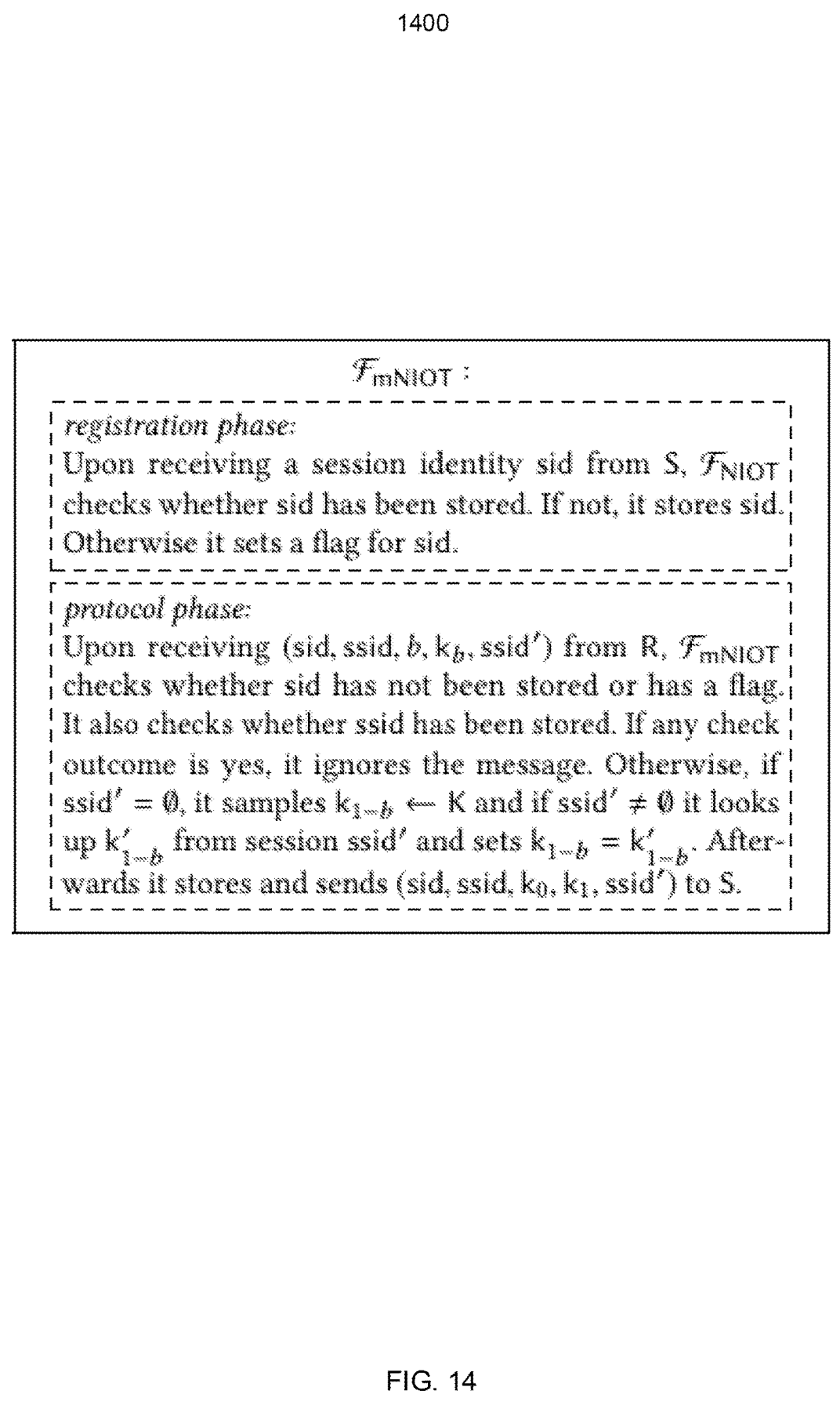

$\mathcal{F}_{mNIOT}$ :

*registration phase:*
Upon receiving a session identity sid from S, $\mathcal{F}_{NIOT}$ checks whether sid has been stored. If not, it stores sid. Otherwise it sets a flag for sid.

*protocol phase:*
Upon receiving (sid, ssid, $b$, $k_b$, ssid') from R, $\mathcal{F}_{mNIOT}$ checks whether sid has not been stored or has a flag. It also checks whether ssid has been stored. If any check outcome is yes, it ignores the message. Otherwise, if ssid' = 0, it samples $k_{1-b} \leftarrow K$ and if ssid' $\neq$ 0 it looks up $k'_{1-b}$ from session ssid' and sets $k_{1-b} = k'_{1-b}$. Afterwards it stores and sends (sid, ssid, $k_0$, $k_1$, ssid') to S.

| Operation | cycles | running time |
|---|---|---|
| Mul | 584561 | 0.277 ms |
| Sub | 1228 | 0.001 ms |
| Add | 1118 | 0.001 ms |
| GHash | 245569 | 0.116 ms |
| Key Generation | 232424 | 0.110 ms |
| $OT_{1,R}$ | 1378214 | 0.653 ms |
| $OT_{1,S}$ | 1867754 | 0.885 ms |
| $OT_{2,R}$ | 1195311 | 0.566 ms |
| $OT_{2,S}$ | 1879205 | 0.890 ms |

| Operation | cycles | running time |
|---|---|---|
| Key Generation | 277570659 | 131.415 ms |
| RSA Enc | 142624 | 0.068 ms |
| RSA Dec | 3820942 | 1.810 ms |
| $OT_{1,R}$ | 186457 | 0.089 ms |
| $OT_{1,S}$ | 7654668 | 3.625 ms |
| $OT_{2,R}$ | 179813 | 0.085 ms |
| $OT_{2,S}$ | 7640627 | 3.618 ms |

FIG. 16

OBLIVIOUS TRANSFER FROM KEY ENCAPSULATION MECHANISMS

CROSS-REFERENCES TO RELATED APPLICATIONS

The present application is a 371 application of International Application No. PCT/US2022/027514, filed May 3, 2022, which claims priority from and is a PCT application of U.S. Provisional Application No. 63/183,565, entitled "Oblivious Transfer From Key Encapsulation Mechanisms" filed May 3, 2021, the entire contents of which are herein incorporated by reference for all purposes.

BACKGROUND

In many instances, parties can establish secure communication channel over a communication network. For instance, a transport layer security (TLS) protocol can allow for establishing confidential and authenticated channels over the internet. In a TLS protocol, two parties that trust each other party can share confidential information while protecting the information from other non-trusted parties. However, in many instances, communicating parties may not trust one another to share confidential information to establish a secure communication channel.

Secure multi party computation (MPC) can allow for a more data communication in which the parties does not want to entrust confidential information to other parties while still collaborating with the other parties. This collaboration can take form in computing a joint function on confidential information unique to each party. Many MPC protocols can include oblivious transfer (OT) functionality that allows a sender and a receiver with the goal to establish OT correlations between the parties. But it can be time consuming to securely establish TLS channels over the Internet for performing MPC. Embodiments can efficiently establish such channels.

SUMMARY

One embodiment of the invention includes a method for establishing an oblivious transfer channel for multi-party computations among a sender computer and a receiver computer. The method comprises, performing by the sender computer: generating a key pair including a public key pk and a secret key sk, wherein the public key pk is accessible to the receiver computer; receiving a pair of receiver values from the receiver computer, wherein a first receiver value of the pair of receiver values includes a random value, and a second receiver value of the pair of receiver values is generated by applying a first function to (1) a first hash output generated from using a first hash function on the public key pk and the random value and (2) a ciphertext $ct_b$ generated using the public key pk; generating a first sender value by using a second hash function, the first receiver value, the second receiver value, and the public key pk according to a choice bit b being 0; generating, according to the choice bit b being 1, a second sender value by using a third hash function, the first receiver value, the second receiver value, and the public key pk; determining an encapsulated key $k_0$ by using the secret key sk and the first sender value; determining an encapsulated key $k_1$ by using the secret key sk and the second sender value; and using the encapsulated key $k_0$ and the encapsulated key $k_1$ to perform the multi-party computations with the receiver computer.

Another embodiment of the invention includes a method for establishing an oblivious transfer channel for multi-party computations among a sender computer and a receiver computer. The method comprises, performing by the receiver computer: obtaining a public key pk that is publicly accessible to the receiver computer, wherein a key pair includes the public key pk and a secret key sk generated by the sender computer; computing a ciphertext $ct_b$ using an encapsulated key $k_b$, the public key pk, and a choice bit b selected by the receiver computer; generating a pair of receiver values, wherein generating a first receiver value of the pair of receiver values includes a random value, and generating a second receiver value of the pair of receiver values includes applying a first function to (1) a first hash output generated from using a first hash function on the public key pk and the random value and (2) the ciphertext $ct_b$; providing the pair of receiver values to the sender computer, wherein the sender computer is configured to determine an encapsulated key $k_0$ and an encapsulated key $k_1$ using the secret key sk and corresponding sender values, wherein the corresponding sender values are generated by using corresponding hash functions, the first receiver value, the second receiver value, and the public key pk according to the choice bit b; and using the encapsulated key $k_b$ and the choice bit b to perform the multi-party computations with the sender computer.

Yet another embodiment of the invention includes a method for establishing an oblivious transfer channel for multi-party computations among a sender computer and a receiver computer. The method comprises, performing by the sender computer: generating a key pair including a public key and a secret key, wherein the public key is publically accessible to a receiving node; receiving a pair of random value from the receiving node, wherein a first random value of the pair is generated from a second random value of the pair, and wherein generating the first random value includes applying a first function to (1) a cryptographic hash generated from the public key and the second random value and (2) ciphertext generated using the public key; determining a first key using the secret key and a first result of a second function between the first random value and a first hash of the public key and the second random value, wherein the second function is an inversion of the first function; determining a second key using the secret key and a second result of the second function between the second random value and a second hash of the public key and the first random value; and using the first key and the second key to perform multi-party computations with the receiver computer.

A better understanding of the nature and advantages of embodiments of the invention may be gained with reference to the following detailed description and accompanying drawings.

BRIEF DESCRIPTION OF THE DRAWINGS

FIG. 1 shows an ideal $\mathcal{F}_{NIOT}$ registration phase and protocol phase happen within the same session.

FIG. 8 shows $\mathcal{F}_{bb}$ functionality that models a PKI.

FIG. 9 shows a $\mathcal{F}_{cert}$ functionality.

FIG. 10 shows a $\mathcal{F}_{cs}$ functionality.

FIG. 11 shows a certified session based on a KEM, MAC and $\mathcal{F}_{cert}$.

FIG. 12 shows an authenticator $\mathcal{C}_A^+$ that authenticates all messages sent by A during all sessions based on $\mathcal{F}_{cs}$.

FIG. 13 shows an authenticator $\mathcal{C}_A^+$ that authenticates all messages sent by A during all sessions based on $\mathcal{F}_{cert}$.

FIG. 14 shows an ideal $\mathcal{F}_{mNIOT}$ functionality.

FIG. 15 shows a running time and cycles of an embodiment and the basic group operations (additions, subtractions, etc.) for curve25519 and average over 25 k runs.

FIG. 16 shows a running time and cycles of an embodiment instantiated with a RSA trapdoor permutation with a key length of 2048 by averaging over 100 runs.

TERMS

Figure 2:
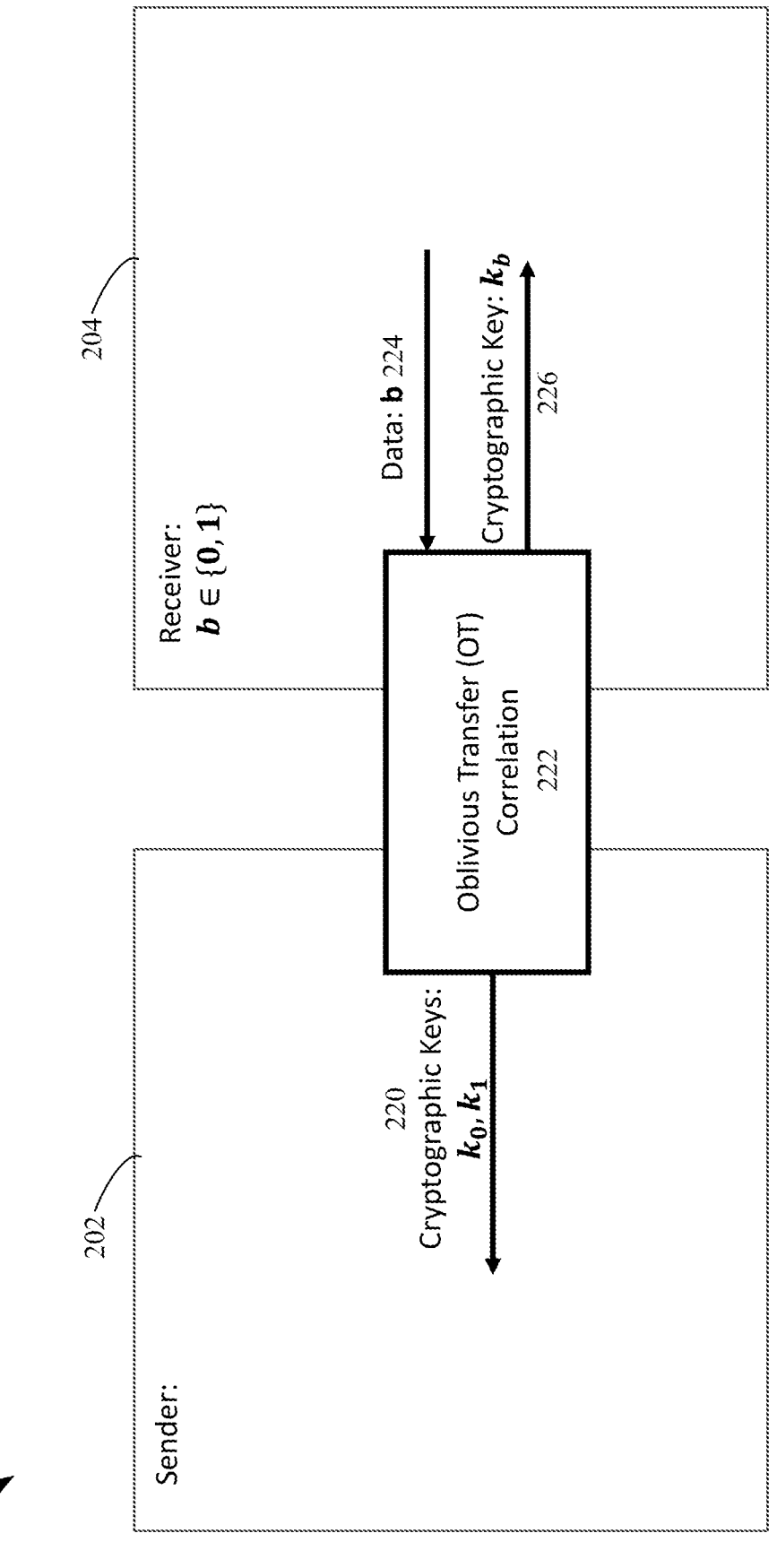
FIG. 2 shows a message flow diagram of a sender computer and a receiver computer securely establishing a OT correlation.

Prior to discussing embodiments of the disclosure, some terms can be described in further detail.

The term "public/private key pair" may include a pair of linked cryptographic keys generated by an entity (e.g., a computing device or an electronic device). The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on elliptic curve cryptography (ECC), lattice or code based cryptosystems such as McEliece or learning with errors (LWE) which may be post-quantum secure.

A "multi-party computation" (MPC) may refer to a computation that is performed by multiple parties. Each party, such as a computer, server, or cryptographic device, may have some inputs to the computation. Each party can collectively calculate the output of the computation using the inputs.

A "secure multi-party computation" (secure MPC) may refer to a multi-party computation that is secure. In some cases, "secure multi-party computation" refers to a multi-party computation in which the parties do not share information or other inputs with each other. Determining a PSI can be accomplished using a secure MPC. The inputs from each computer in an MPC may be secret shares of a value that is known to one computer. For example, a first computer can split a database value into multiple secret shares and distribute the shares among the computers. Only the first computer may know how to assemble the shares to reconstruct the database value.

An "encryption key" may include any data value or other information suitable to cryptographically encrypt data. A "decryption key" may include any data value or other information suitable to decrypt encrypted data. In some cases, the same key used to encrypt data may be operable to decrypt the data. Such a key may be known as a symmetric encryption key.

DETAILED DESCRIPTION

In many instances, parties can establish secure communication channel over a communication network. For example, secure multi party computation (MPC) can allow for a more data communication in which the parties do not want to entrust confidential information to other parties while still collaborate with other parties. Many MPC protocols can include oblivious transfer (OT) functionality that allows a sender and a receiver with the goal to establish OT correlations between the parties.

A common starting point for many MPC protocols can be an oblivious transfer (OT) model in which parties have access to an oblivious transfer (OT) functionality. An oblivious transfer (OT) can be a protocol between a sender and a receiver with the goal to establish OT correlations between them, i.e., a sender holds encapsulated keys $k_0$, $k_1$, and a receiver holds an encapsulated key $k_b$, where b is a choice bit of the receiver. By the security of OT, $k_{1-b}$ is only known to the sender, while the choice bit b is only known to the receiver, and the encapsulated key $k_b$ is known to the sender and the receiver, but no other party Some embodiments can use MPC protocols in the oblivious transfer (OT) hybrid model such that it is sufficient to establish OT correlations for such a channel. Some embodiments can combine different notions of UC security proposed in both the MPC and authenticated key exchange settings. Through this work, we show how an OT protocol can be composed with a secure authenticator to ensure the authenticity of messages sent during the OT.

In addition, some embodiments can adapt and analyze non-interactive OTs based on dense key encapsulation mechanisms (KEMs) in the random oracle model, where the first message, i.e., public key, can be reused. These KEMs can be instantiated based on CDH, RSA and LWE and after a performance and security evaluation.

Unlike in a key exchange protocol where only one key for a confidential channel needs to be established, an MPC protocol needs a large number of OT correlations. The multiple communications can lead to reduced computational efficiency and increased risk of a malicious party obtaining data being transmitted between a sender and receiver. To solve this problem, the embodiment can perform an efficient OT protocol to efficiently establish OT correlations that could be used for an MPC protocol.

The present embodiments relate to a non-interactive OT (NIOT) protocol using a key encapsulation mechanism (KEM). The sender node can generate a private, public key pair (sk, pk) that is independent of its input or generated OT correlations. Given that a receiver knows the public key (pk), the receiver can reuse the public key (pk) to establish multiple, independent OT correlations. This can make the oblivious transfer more efficient, as the only communication between the sender and the receiver can include providing random values $(r_0, r_1)$ to the sender, and the sender no longer has to send a new data (e.g., public key) to the receiver when generating a new correlation.

I. INTRODUCTION

The Transport Layer Security (TLS) protocol [Eric Rescorla and Tim Dierks, The Transport Layer Security (TLS) Protocol Version 1.2. RFC 5246, August 2008; Eric Rescorla, The Transport Layer Security (TLS) Protocol Version 1.3. RFC 8446, August 2018] provides a robust and easy to use framework for the establishment of confidential and authenticated channels. Nevertheless, this protocol only provides a basic cryptographic functionality, that is, it enables two parties that trust each other to share confidential information while protecting said information from other non-trusted parties.

Secure multi-party computation (MPC) allows a more nuanced setting in which one does not want to entrust confidential information to the other participants in the protocol but still enable them to collaborate. This collaboration takes the form of computing a joint function on their own respective confidential inputs.

An efficient and easy to use framework that allows us to execute MPC protocols with arbitrary parties over the internet can be built. Similar to the TLS setting, we cannot assume that authenticated or confidential channels between the parties are already established.

A common starting point for many MPC protocols is the OT-hybrid model in which parties have access to an oblivious transfer (OT) functionality [Andrew Chi-Chih Yao, 23rd FOCS, pages 160-164. IEEE Computer Society Press, November 1982; Andrew Chi-Chih Yao, 27th FOCS, pages 162-167, IEEE Computer Society Press, October 1986; Goldreich et al., 19th ACM STOC, pages 218-229, ACM Press, May 1987; Joe Kilian, 20th ACM STOC, pages 20-31, ACM Press, May 1988; Ishai et al., CRYPTO 2008, volume 5157 of LNCS, pages 572-591, Springer, Heidelberg, August 2008; Ishai et al., EUROCRYPT 2011, volume 6632 of LNCS, pages 406-425, Springer, Heidelberg, May 2011; Crépeau et al., CRYPTO '95, volume 963 of LNCS, pages 110-123, Springer, Heidel-berg, August 1995; Fabrice Benhamouda and Huijia Lin, EUROCRYPT 2018, Part II, volume 10821 of LNCS, pages 500-532, Springer, Heidelberg, April/May 2018; Sanjam Garg and Akshayaram Srinivasan, EUROCRYPT 2018, Part II, volume 10821 of LNCS, pages 468-499, Springer, Heidelberg, April/May 2018]. An oblivious transfer (OT) [Michael O. Rabin, How to exchange secrets by oblivious transfer, Technical report, Harvard University, 1981; Even et al., CRYPTO '82, pages 205-210, Plenum Press, New York, USA, 1982], is a protocol between a sender and a receiver with the goal to establish OT correlations between them, i.e., the sender holds $k_0$, $k_1$ and the receiver b, $k_b$ for a choice bit b. By the security of OT, $k_{1-b}$ is only known to the sender, b only to the receiver and $k_b$ to the sender and receiver but no other party.

To efficiently establish OT correlations that could be used for an arbitrary MPC protocol in the OT-hybrid model, i.e., a channel for MPC, an efficient OT protocol can be used. Unlike in a key-exchange protocol where only one key needs to be established for a confidential channel, an MPC protocol usually needs a large number of OT correlations. By using an OT extension technique [Donald Beaver, 28th ACM STOC, pages 479-488, ACM Press, May 1996; Ishai et al., CRYPTO 2003, volume 2729 of LNCS, pages 145-161, Springer, Heidelberg, August 2003; Orrù et al., CT-RSA 2017, volume 10159 of LNCS, pages 381-396, Springer, Heidelberg, February 2017; Asharov et al., EURO-CRYPT 2015, Part I, volume 9056 of LNCS, pages 673-701, Springer, Heidel-berg, April 2015; Keller et al., CRYPTO 2015, Part I, volume 9215 of LNCS, pages 724-741, Springer, Heidelberg, August 2015], it is sufficient to establish an amount of OT correlations that is identical to the security parameter. Nevertheless, to minimize the overhead compared to a key exchange, it is important to leverage synergies between the OT correlations we establish.

Security for MPC and OT is typically defined in the UC framework [Ran Canetti. 42nd FOCS, pages 136-145, IEEE Computer Society Press, October 2001]. The advantage of the UC framework is that it allows us to universally compose protocols without negatively impacting security and it ensures confidentiality for the inputs of an MPC protocol execution. The UC framework has also been used to model security for authenticated key exchange [Bellare et al., in 30th ACM STOC, pages 419-428, ACM Press, May 1998; Ran Canetti et al., PKC 2016, Part II, volume 9615 of LNCS, pages 265-296, Springer, Heidelberg, March 2016], which can cover both, authenticity and confidentiality. The authenticity in UC can be established using an authenticator. Such an authenticator transforms a protocol that is secure in a setting that assumes authenticated channels to a protocol that is secure even when the channels are not authenticated.

In practice, a public-key infrastructure (PKI) is needed for the purposes of establishing authenticated channels and it is a non-trivial task to integrate it into the UC framework. The work of Canetti, Shahaf and Vald [Ran Canetti et al., PKC 2016, Part II, volume 9615 of LNCS, pages 265-296, Springer, Heidelberg, March 2016] have proposed a UC notion with PKI for the authenticated key exchange setting.

II. PRELIMINARIES

A. Notations

Let K denote the security parameter. For $n \in \mathbb{N}$, we define the following set $[n] := \{1, \ldots, n\}$. By $x \leftarrow X$ we denote the sampling of x uniformly from set X. We use $\Pi^{A,B}$, $\Pi$ when A and B are clear from the context, to denote a protocol between two parties A and B. For an algorithm A(x; r), we use x to denote the input and r to denote the random coins. We use $(A(a), B(b))_\Pi$ to denote the joint output distribution of A and B when interacting in protocol $\Pi$ with inputs a and b respectively. For an ideal functionality $\mathcal{F}$ and malicious party $\mathcal{A}$, we denote $(\mathcal{F}, \mathcal{A})_{\Pi^{A,B}}$ as the joint output of $\mathcal{A}$ and $\mathcal{F}$, where $\mathcal{A}$ produces the output of party A and $\mathcal{F}$ produces the output of party B respectively. When clear from the context, we omit $\Pi^{A,B}$.

For a cyclic group of order p, we use the bracket notation to denote its elements, i.e., let g be a generator, then $1_g := g$, $a_g + b1_g := g^{a+b}$. We omit g when clear from context.

Definition 2.1 (Random Oracle) A random oracle over a set of domains and an image is a collection of functions H that maps an element q within one of the domains to a uniform element H(q) in the image.

B. Key Encapsulation Mechanism

Definition 2.2 (Key Encapsulation Mechanism (KEM)) A Key Encapsulation Mechanism can include three probabilistic polynomial time (ppt) algorithms/functions (KGen, Enc, Dec) and a key space K with the following syntax:

KGen: The key generation algorithm takes as input $1^\kappa$ and outputs a public-key secret-key pair (pk, sk).

Enc: The encapsulation takes as input pk and outputs an encapsulation ct and a key k.

Dec: The decapsulation takes as inputs sk and ct and outputs a key k.

Further, we require correctness and one-way security (OW-CPA), indistinguishability under chosen-plaintext attacks (IND-CPA) or indistinguishability under chosen-ciphertext attacks (IND-CCA):

Correctness:

$$Pr[k = Dec(sk, \ ct)] \geq 1 - negl,$$

where $(pk, sk) \leftarrow KGen(1^\kappa)$ and $(ct, k) \leftarrow Enc(pk)$.

For any ppt adversary $\mathcal{A}$ and any polynomial size auxiliary input z, $$|Pr[\mathcal{A}(z, pk, ct) = k] \leq negl,$$

where $(pk, sk) \leftarrow KGen(1^k)$ and $(ct, k) \leftarrow Enc(pk)$.

OW-CPA Security: For any ppt distinguisher D and any polynomial size auxiliary input z, $$|Pr[\mathcal{A}(z, pk, ct, k) = 1] - Pr[D(z, pk, ct, u) = 1]| \leq negl,$$

where $(pk, sk) \leftarrow KGen(1^k)$, and $(ct, k) \leftarrow Enc(pk)$ and $u \leftarrow K$.

IND-CPA Security: For any ppt distinguisher D and any polynomial size auxiliary input z, $$|Pr[D, pk, ct^*, k) = 1] - Pr[D(z, pk, ct^*, u) = 1]| \leq negl,$$

where $(pk, sk) \leftarrow KGen(1^k)$, $(ct, k) \leftarrow Enc(pk)$ and $u \leftarrow K$.

Further, D has access to a decapsulation oracle Dec(sk,•) that allows him to decapsulate arbitrary encapsulations except ct*.

Definition 2.3 (Dense KEM) We call a KEM dense over a group $\mathcal{G}$ iff for any ppt distinguisher $(D_1, D_2)$ and any polynomial size auxiliary input z, $$|Pr[D_2(z, st, ct) = 1] - Pr[D_2(z, st, u) = 1] \leq negl,$$

where $(st, pk) \leftarrow D_1(1^k)$, $(ct, k) \leftarrow Enc(pk)$ and $u \leftarrow \mathcal{G}$.

We can construct a dense OW-CPA KEM from CDH, trapdoor functions and LWE with superpolynomial modulus to noise ratio. The three constructions are straightforward. Based on CDH, we get the following dense OW-CPA secure KEM for public parameters consisting of a cyclic group $\mathcal{G}$ of prime order p and a generator 1.

$KGen$: Sample $a \leftarrow \mathbb{Z}_p/\{0\}$. Output $pk = a$ and $sk = a$.

$Enc(pk)$: Sample $b \leftarrow \mathbb{Z}_p/\{0\}$. Output $ct = b$ and $k = b \cdot pk$.

$Dec(sk, ct)$: Output $k = sk, ct$.

Correctness follows from k=sk·ct=a·[[b]]=[[ab]]=b[[a]]= b·pk. OW-CPA security immediately follows from the hardness of computing ab given [[a]], [[b]] (CDH).

Let F be a family of trapdoor functions that maps from an efficiently sampleable domain D into an efficiently sampleable group $\mathcal{G}$. Then our KEM is constructed as follows:

$KGen(1^k)$: Sample $(f, f^{-1}) \leftarrow F$. Output $pk = f$ and $sk = f^{-1}$.

$Enc$: Sample $x \leftarrow D$. Output $ct = f(x)$ and $k = x$.

$Dec(sk, ct)$: Output $k = f^{-1}(ct)$.

Correctness follows from the correctness of F and OW-CPA security follows from the one-wayness of F.

Finally, there is the following LWE-based dense IND-CPA secure KEM using a public parameter $A \leftarrow \mathbb{Z}_p^{m \times n}$.

$KGen(1^k)$: Sample $s \leftarrow$ $\mathbb{Z}_p^n$ and a noise term $e \leftarrow \mathcal{X}$ for some noise distribution $\mathcal{X}$.

Output pk $= As + e$ and $sk = s$.

$Enc(pk)$: Sample $R \leftarrow \{-1, 0, 1\}^{m \times m}$. Output $ct = RA, k = \lfloor Rpk \rceil$.

$Dec(sk, ct)$: Output $k = \lfloor ct \cdot sk \rceil$.

For achieving correctness, the rounding function $\lfloor \cdot \rceil$ needs to drop all lower significant bits to completely remove the noise. Then $k = \lfloor ct \cdot sk \rceil = \lfloor RAs \rceil = \lfloor RAs + Re \rceil = \lfloor Rpk \rceil$. For the density property, we need that the leftover hash lemma applies. To apply this lemma, we need that A is uniform and m>n log p. The requirement on the rounding function results in rather inefficient parameters and as a result we put less focus on this KEM.

C. Oblivious Transfer

We follow the simplified UC security framework which is sufficient for full UC security [Canetti et al., *CRYPTO* 2015, *Part II*, volume 9216 of *LNCS*, pages 3-22, Springer, Heidelberg, August 2015]. FIG. 1 defines the ideal NIOT functionality $\mathcal{F}_{NIOT}$.

Definition 2.4 (Oblivious Transfer) We call a protocol Π between two ppt parties, a sender S and a receiver R, an oblivious transfer if at the end, S outputs two strings $(k_0, k_1)$ and R outputs b∈ {0,1} and $k_b$. For security, we require two properties with respect to functionality $\mathcal{F}_{NIOT}$.

Security Against a Malicious Sender: For any ppt adversary $\mathcal{A}$, there exists a ppt adversary $\mathcal{A}$' such that for any ppt environment D and any polynomial size auxiliary input z $$|Pr[D(z, (\mathcal{A}, R)_\Pi) = 1] - Pr[D(z, (\mathcal{A}', \mathcal{F}_{NIOT})) = 1]| = negl,$$

where all algorithms receive input $1^\kappa$. R additionally receives input $\mathbb{S}$.

Security Against a Malicious Receiver: For any ppt adversary $\mathcal{A}$, there exists a ppt adversary $\mathcal{A}''$ such that for any ppt environment D and any polynomial size auxiliary input z $$|Pr[D(z, (S, \mathcal{A})_\Pi) = 1] - Pr[D(z, (\mathcal{F}_{NIOT}, \mathcal{A}')) = 1]| = negl,$$

where all algorithms receive input $1^\kappa$.

III. SECURE TRANSFERS USING OBLIVIOUS TRANSFERS

An oblivious transfer is a cryptographic primitive often used in the context of secure multi party computation, and is privacy-preserving during a joint computation. Among others, it solves the task of securely distributing cryptographic keys for cryptography that can be seen as encrypted programs (e.g., multi-party computations).

In an oblivious transfer, a sender and a receiver interact in a protocol and at the end of the protocol, the sender outputs two messages $m_0$ and $m_1$ while the receiver outputs b and $m_b$ for a choice bit b. Security asks that the sender does not learn b and the receiver does not learn $m_{1-b}$. Oblivious transfer can imply establishing OT correlations between the sender and the receiver, i.e., the sender holds cryptographic keys $k_0$, $k_1$ and the receiver holds cryptographic key $k_b$ for a choice bit b. Security asks that the sender does not learn b and the receiver does not learn $k_{1-b}$.

An oblivious transfer correlation between the sender and the receiver can be established in order for the sender and the receiver to securely exchange the information using the oblivious transfer. The sender can encrypt the messages $m_0$, and $m_1$ using the cryptographic keys $k_0$ and $k_1$ respectively to generate encrypted messages $m'_0$ and $m'_1$. The sender can send the encrypted messages $m'_0$ and $m'_1$ to the receiver, where the receiver can decrypt only the encrypted message $m'_b$ using a cryptographic key $k_b$ to obtain the message $m_b$ according to the choice bit b. Security holds that the sender does not learn the choice bit b while the receiver does not learn a cryptographic key $k_{1-b}$.

A. Establishing OT Correlations

FIG. 2 shows a message flow diagram of a sender computer and a receiver securely establishing a OT correlation. The message flow diagram 200 shows a receiver computer 204 generating a cryptographic key $k_b$ and a sender computer securely generating cryptographic keys $k_0$ and $k_1$. Security asks that the receiver computer 204 does not learn a cryptographic key $k_{1-b}$ while the sender computer 202 does not learn the choice bit b. Establishing a OT correlation can also be known as establishing a secure channel or framework, as once the OT correlation is established, the messages can be exchanged between the sender computer and the receiver in a secure manner.

In oblivious transfer correlation 222, a sender computer 202 can generate some data (e.g., public key) and send the data to a receiver computer 204. The receiver computer 204 can use the received data to generate a cryptographic key $k_b$ according to a choice bit b, and generate random values using the generated cryptographic key $k_b$. The receiver computer 204 can send the random values to the sender computer 202, where the sender computer 202 can use the random values to generate cryptographic keys $k_0$ and $k_1$. At the end of establishing a OT correlation between the sender computer and the receiver computer, the sender computer 65 has the cryptographic keys $k_0$ and $k_1$ and the receiver computer has the cryptographic key $k_b$, where the sender computer does not know the choice bit b while the receiver computer does not know a cryptographic key $k_{1-b}$.

The choice bit b can be an element of a set of inputs such as the set {0, 1}. The actual value of the choice bit b can determine which of the cryptographic keys 226 is decrypted by the receiver 202. The input value b may thus correspond to one of the elements of set of cryptographic keys 220.

In response to receiving some data from the sender computer 202, the receiver computer 204 can use the data to generate a cryptographic key $k_b$. In some examples, the cryptographic key $k_b$ can be randomly generated, and the random values that are sent to the sender computer can be generated using the data. The data (e.g., public key) that are used to generate cryptographic key $k_b$ can be reused to generate different cryptographic keys for different OT correlations. For example, after establishing a OT correlation where the receiver computer can generate a cryptographic key $k_{b1}$ using the data for a choice bit b1, the sender computer and the receiver computer can establish a different OT correlation where the receiver computer can generate a different cryptographic key $k_{b2}$ using the same data for a different choice bit b2.

The sender computer 202 can generate cryptographic keys $k_0$ and $k_1$ by using the random values of the receiver computer without learning the choice bit b of the receiver computer. The random values allow the receiver computer 204 to give enough information to the sender computer 202 to generate two cryptographic keys $k_0$ and $k_1$, where one of the keys can be the cryptographic key $k_b$. Security holds that the sender computer 202 does not learn the choice bit b while the receiver computer does not learn the cryptographic key $k_{1-b}$. For example, if the choice bit b is 0, then the receiver computer 204 may generate a first cryptographic key $k_0$, and generate random values using the first cryptographic key $k_0$. The random values would give enough data to the sender computer to generate two cryptographic keys $k_0$ and $k_1$, where the sender computer 202 may not learn the choice bit b is 0 and the receiver computer 204 does not learn the other cryptographic key $k_{1-b}$ of the sender computer.

Once the OT correlation is established, the sender computer 202 can output the cryptographic keys $k_0$ and $k_1$, and the receiver computer 204 can output the choice bit b and the cryptographic key $k_b$ as outputs to be used in a multi-party protocol. The sender computer 202 and the receiver computer 204 can exchange messages using OT correlation in an oblivious transfer to exchange data in a secure manner.

B. Oblivious Transfer

Figure 3:
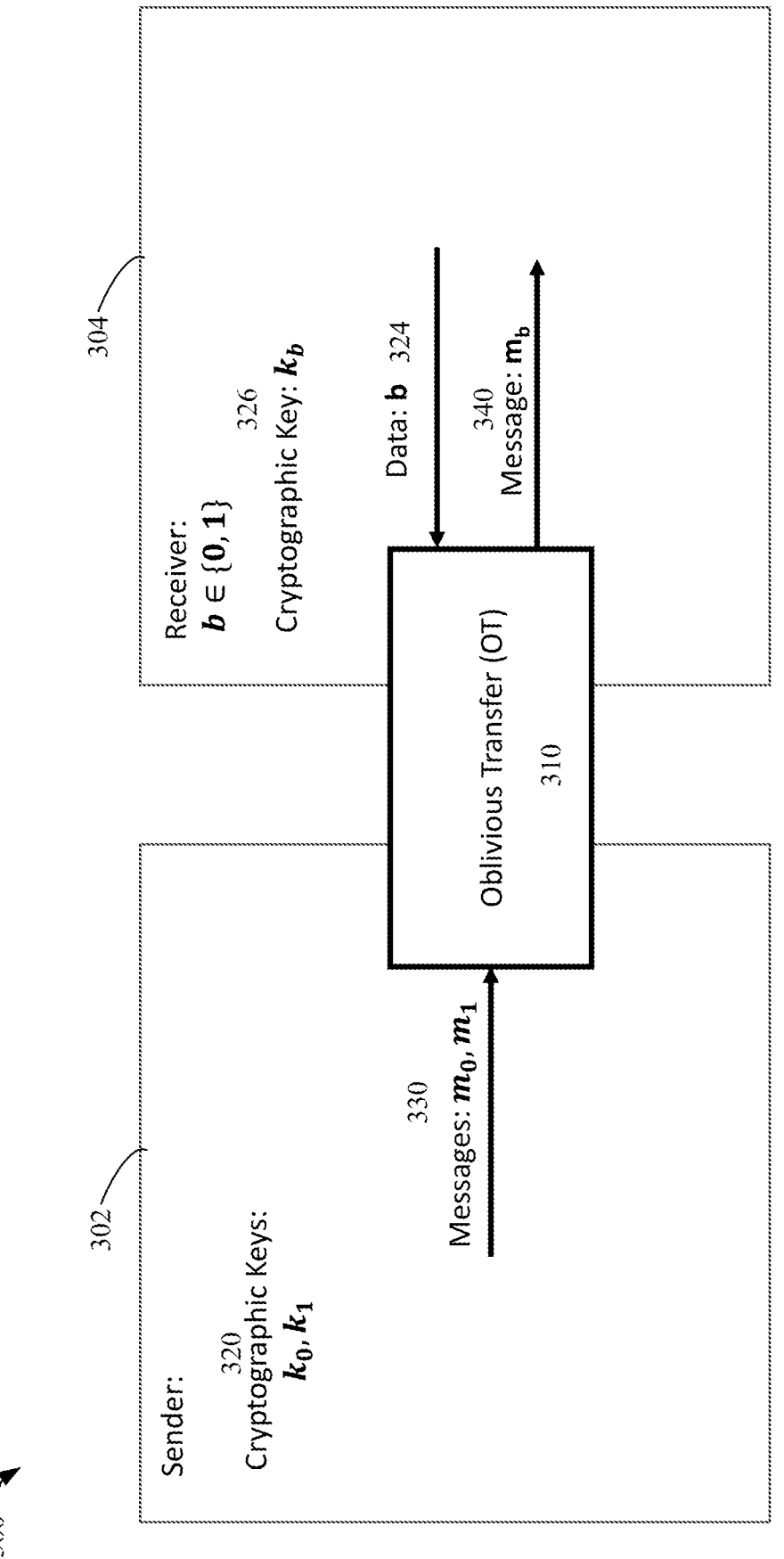
FIG. 3 shows a message flow diagram of an example secure data exchange using an oblivious transfer.

FIG. 3 shows a message flow diagram of an example secure data exchange using an oblivious transfer. FIG. 3 exchanges messages $m_0$ and $m_1$ after establishing OT correlations between a sender computer 302 and a receiver computer 304 in FIG. 2. The sender computer 202 has cryptographic keys $k_0$ and $k_1$, while the receiver computer 304 has a cryptographic key $k_b$ according to the choice bit b from FIG. 2.

The sender computer 302 can encrypt some or all of the messages 330 using the cryptographic keys 320. The sender computer 302 can send the encrypted messages to the receiver computer 304. The receiver computer 304 can decrypt one of the encrypted messages using a cryptographic key 326 to obtain a message 340. The receiver computer 304 is unable to decrypt other encrypted messages, as the receiver computer 304 does not have necessary cryptographic key to decrypt them. For example, if the receiver computer 304 has a choice bit b of 0, then the receiver computer 304 is able to decrypt one of the encrypted messages to obtain $m_0$ using a first cryptographic key $k_0$.

The receiver computer 304 is unable to decrypt other encrypted messages and obtain the message $m_1$, as the receiver computer 304 does not have a second cryptographic key $k_1$.

In oblivious transfer 310, the sender computer 302 has a set of messages 330 including a first message $m_0$ and a second message $m_1$. The sender computer 302 can encrypt both the first message $m_0$ and the second message $m_1$ using the cryptographic keys $k_0$ and $k_1$ respectively to generate a first encrypted message $m'_0$ and a second encrypted message $m'_1$. The sender computer 302 can send both encrypted messages $m'_0$ and $m'_1$ to the receiver computer 304, and the receiver computer 304 can decrypt the encrypted message $m'_b$ using the cryptographic key $k_b$. For example, if the input value b is set to 0, then the receiver computer 304 can decrypt only the encrypted message $m'_0$ to obtain the first message $m_0$ using a first cryptographic key $k_0$. The receiver computer 304 is unable to decrypt $m'_1$ as the receiver computer 304 does not have a second cryptographic key $k_1$. Therefore, at the end of the oblivious transfer protocol, the receiver computer 304 does not learn the message $m_{1-b}$.

By transmitting all two encrypted messages $m'_0$ and $m'_1$, the sender computer 302 can be prevented from knowing which of the cryptographic keys will be used or accessed by the receiver computer 304. The sender computer 302 can only be aware that a request for a message $m_b$ was made by the receiver computer 304, and that encrypted version of the messages 330 were sent to the receiver computer 304.

The oblivious transfer can be used in a various multi-party computations such as a garbled circuit. In the garbled circuit, the two mistrusting parties (e.g., a sender computer and a receiver) can perform a secure computation to jointly evaluate a function (e.g., compare, XOR, etc.) over their private inputs. Although the function is known by both parties, the two mistrusting parties may not want their private inputs to be revealed to each other. In order to perform a secure computation without revealing each other's private inputs, a first party encrypts its own inputs and the function, and sends it to a second party. A second party, receiving the encrypted inputs and the encrypted function (e.g., garbled circuit), can encrypt its own inputs to calculate the encrypted function and generate an output. To this end, the second party can receive help from the first party, as only the first party knows the method to encrypt. Since the second party does not want to reveal its own inputs to the first party, the second party encrypts its inputs through oblivious transfer, where the first party is the sender computer and the second party is the receiver of the oblivious transfer. Once the second party is able to encrypt all of its inputs successfully, then the second party can use the second party's encrypted input, the first party's encrypted input, and the encrypted function to generate an encrypted output. The encrypted output can then be communicated between the two parties to decrypt and learn the output. Therefore, the two mistrusting parties are able to perform a secure computation in which neither parties reveal their inputs but still generate an encrypted output.

IV. OBLIVIOUS TRANSFER USING KEM IMPLEMENTATIONS

This disclosure provides implementation for two oblivious transfer protocols using key encapsulation mechanisms to establish an efficient oblivious transfer channel or framework. The two OT protocols are non-interactive OTs, in which a sender generates private, public key pair (pk, sk) that is independent of its input or generated OT correlations.

The two OT protocols use a cryptographic hash function and a one-way secure dense key encapsulation mechanism (KEM).

Two objectives for the two OT protocols are as follows. The first objective is to construct an efficient and secure OT protocol that follows a TLS-like design and can leverage existing PKI infrastructure, i.e., by enabling the reuse of public keys. The second objective is to provide suitable security definitions for authenticating messages sent during the OT protocol.

A. First Oblivious Transfer (OT1)

Figure 4:
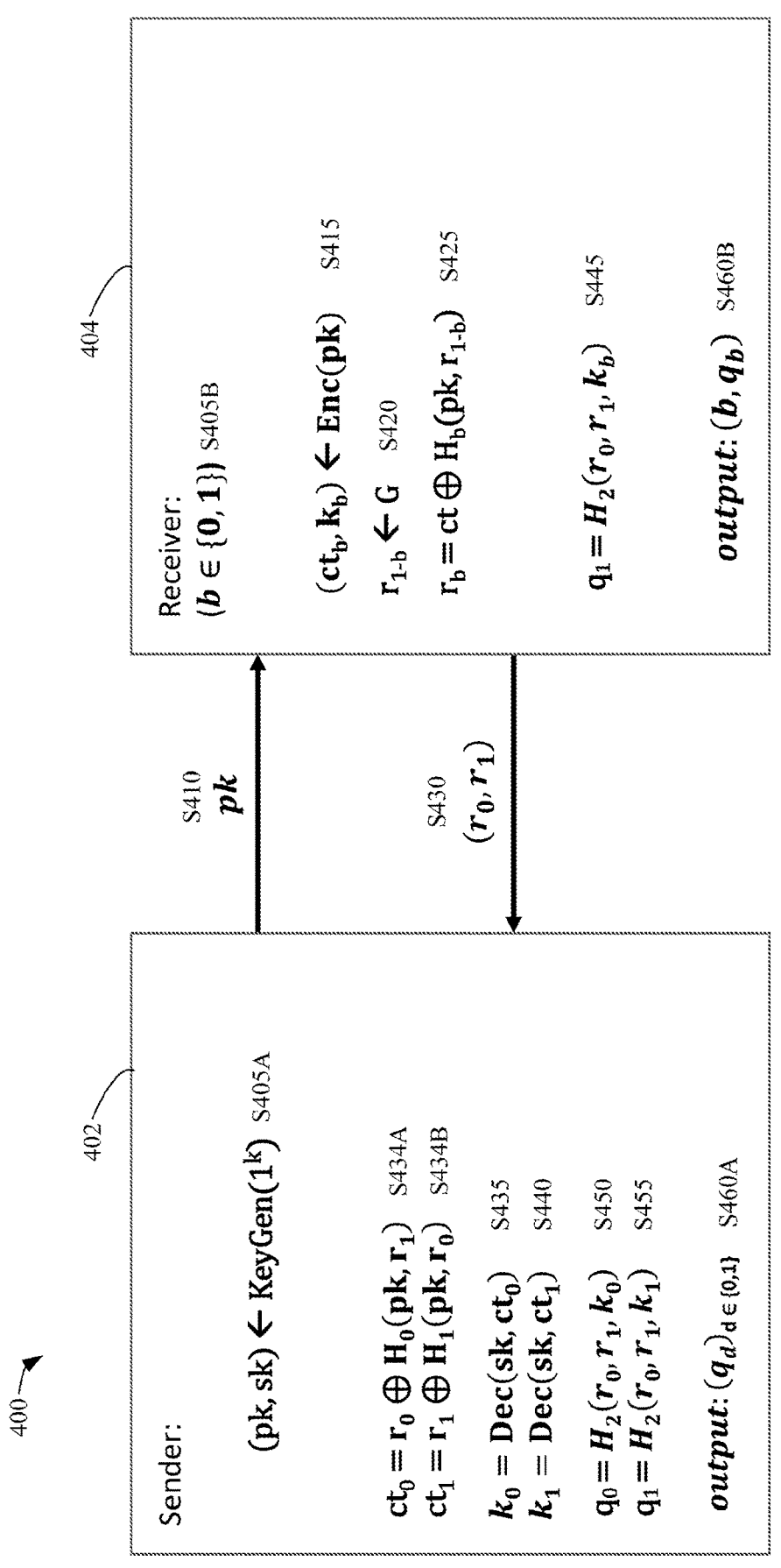
FIG. 4 shows a first oblivious transfer $(OT_1)$ flow diagram of establishing an efficient OT channel using key encapsulation mechanism (KEM).

FIG. 4 shows a first oblivious transfer ($OT_1$) flow diagram 400 of a sender computer 402 and a receiver computer 404 establishing an efficient oblivious transfer channel or correlation using key encapsulation mechanism (KEM). The first oblivious transfer ($OT_1$) protocol is split into two phases: a registration phase and a protocol phase. In the registration phase, the receiver computer 404 can register the public key (pk). This phase is in steps S405A, S405B, and S410. In the protocol phase, the sender computer 402 and the receiver computer 404 can establish an OT correlation. This phase is in steps S415 to S460B. The OT protocol can employ public key cryptographic techniques and hash function to ensure that the sender computer 402 does not identify the choice bit b while the receiver computer 404 does not identify an encapsulated key ($k_{1-b}$).

In step S405A, the sender computer 402 can generate a private, public key pair (sk, pk) that can be independent of its input or generated OT correlations using a cryptographic key generation function (KeyGen($1^k$)). In step S405B, the receiver computer 404 can sample a choice bit b, where the choice bit b has a bit value of 0 or 1. In some embodiments, the choice bit b can be part of an input to a multi-party computation.

In step S410, the sender computer 402 can provide the public key (pk) so it is accessible to the receiver. For example, sender computer 402 can publish the public key (pk) on a public server (e.g., internet or public key infrastructure) that is accessible to multiple parties including the receiver computer 404. The receiver computer 404 can then obtain the public key (pk) from the public server. In some embodiment, the sender computer 402 can send the public key (pk) directly to the receiver computer 404.

In step S415, the receiver computer 404 can perform an encapsulation using the public key (pk) to generate an encapsulated key ($k_b$) and a first ciphertext ($ct_b$). As explained above, an encapsulation can take as input a public key (pk) and outputs an encapsulation ct (sometimes referred to as ciphertext) and a key k. As an example, the encapsulated key ($k_b$) can be generated at random, and the ciphertext ($ct_b$) can be a public key encryption of the encapsulated key ($k_b$) using the public key (pk). Example key encapsulation mechanisms (KEMs) are provided herein, e.g., in section II.B.

In step S420, the receiver computer 404 can generate a random value ($r_{1-b}$) using a random number generator (G).

In step S425, the receiver computer 404 can generate a random value ($r_b$) by performing a first function (e.g., a first group operation) on a first hash output in conjunction with the ciphertext ($ct_b$). In some embodiment, the random value ($r_b$) can be called as an intermediate value ($r_b$). The first hash output can be obtained by using a hash function $H_{b()}$ on the public key and the random value ($r_{1-b}$). For example, the public key (pk) and the random value ($r_{1-b}$) can be subjected to the hash function $H_{b()}$ to produce a first hash output. The receiver computer 404 can then perform a XOR operation of the ciphertext ($ct_b$) and the first hash output to generate the random value $r_b$. Although the XOR operation is used as the first function in this example, the first function operators can be any invertible operators such as addition, multiplication, subtraction, division, XOR, etc.

In step S430, the receiver computer 404 can send the random value $(r_b)$ and the random value $(r_{1-b})$ to the sender computer 402, which can be sent as a random value $(r_0)$ and a random value $(r_1)$ depending on the choice bit b. In some embodiments, the random value $(r_0)$ and the random value $(r_1)$ can be called an intermediate value $(r_0)$ and an intermediate value $(r_1)$ respectively. The sender computer 402 may not know which of the multiple values $(r_0, r_1)$ is useful in obtaining the encapsulated key $(k_b)$, as the sender computer 402 does not know the value of the choice bit b.

In step S434A, the sender computer 402 can obtain a ciphertext $(ct_0)$ by performing a second function (e.g., a second group operation) on the random value $(r_0)$ in conjunction with a second hash output. The second hash output can be obtained by using a hash function $H_{0( )}$ on the public key (pk) and the random value $(r_1)$. The second function operator can be any invertible operators such as addition, multiplication, subtraction, division, XOR, etc that is inversion of the first function operator. For example, if the first function operator is an addition, then the second function operator is a subtraction.

In step S434B, the sender computer 402 can obtain a ciphertext $ct_1$ by performing the second function on the random value $r_1$ in conjunction with a third hash output. The third hash output can be obtained by using a hash function $H_{1( )}$ on the public key (pk) and the random value $(r_0)$.

The ciphertext $(ct_b)$ of the receiver computer 404 can either have the value of the ciphertext $(ct_0)$ or the ciphertext $(ct_1)$ depending on the choice bit b. The hash function $H_{b( )}$ of the receiver computer 344 can also either be the hash function $H_{0( )}$ or third hash function $H_{1( )}$ depending on the choice bit b.

In step S435, the sender computer 402 can decapsulate the ciphertext $(ct_0)$ using the secret key (sk) to generate an encapsulated key $(k_0)$. Example decapsulation techniques are described herein, e.g., in section II.B. As explained above, the decapsulation can take as inputs a secret key sk and the encapsulation ct and outputs a key k. The decapsulation can act as a decryption operation.

In step S440, the sender computer 402 can decapsulate the ciphertext $(ct_1)$ using the secret key (sk) to generate a encapsulated key $(k_1)$. The encapsulated key $(k_b)$ of the receiver computer 404 can either have the value of the encapsulated key $(k_0)$ or the encapsulated key $(k_1)$ depending on the choice bit b. The sender computer 402 may not know the choice bit b as the sender computer 402 does not know the value of the choice bit b.

Once the sender computer generates the third and encapsulated keys $(k_0, k_1)$ and the receiver computer generates the encapsulated key $(k_b)$, the sender computer 402 can output the third and encapsulated keys $(k_0, k_1)$ as outputs while the receiver computer 404 can output the encapsulated key $(k_b)$ along with the choice bit b as outputs. These outputs can be used in MPC protocols, similar to how the cryptographic keys were used in FIG. 3.

In some embodiments, the sender computer 402 and the receiver computer 404 can add extra layer of security by hashing the encapsulated keys with a hash function $H_{2( )}$.

In step S445, the receiver computer 404 can use the hash function $H_{2( )}$ on the random value $(r_b)$ and the random value $(r_{1-b})$, which may be represented as $r_0$ and $r_1$ depending on the choice bit b, along with the encapsulated key $(k_b)$ to generate a session key $(q_b)$.

In step S460B, the receiver computer 404 can output the choice bit b and the session key $(q_b)$ for use in MPC protocols. In step S450, the sender computer 402 can use the hash function $H_{2( )}$ on the random value $(r_0)$, random value $(r_1)$, and the encapsulated key $(k_0)$ to generate a session key $(q_0)$. In step S455, the sender computer 402 can use the hash function $H_{2( )}$ on the random value $(r_0)$, random value $(r_1)$, and the encapsulated key $(k_1)$ to generate a session key $(q_1)$.

In step S460A, the sender computer 402 can output the session key $(q_0)$ and the session key $(q_1)$ for use in MPC protocols.

The session key $(q_b)$ of the receiver computer 404 can either have the value of the session key $(q_0)$ or the session key $(q_1)$ depending on the choice bit b. The sender computer 402 does not know the value of the choice bit b while the receiver computer 404 does not know the value of a session key $(q_{1-b})$.

B. Second Oblivious Transfer $(OT_2)$

Figure 5:
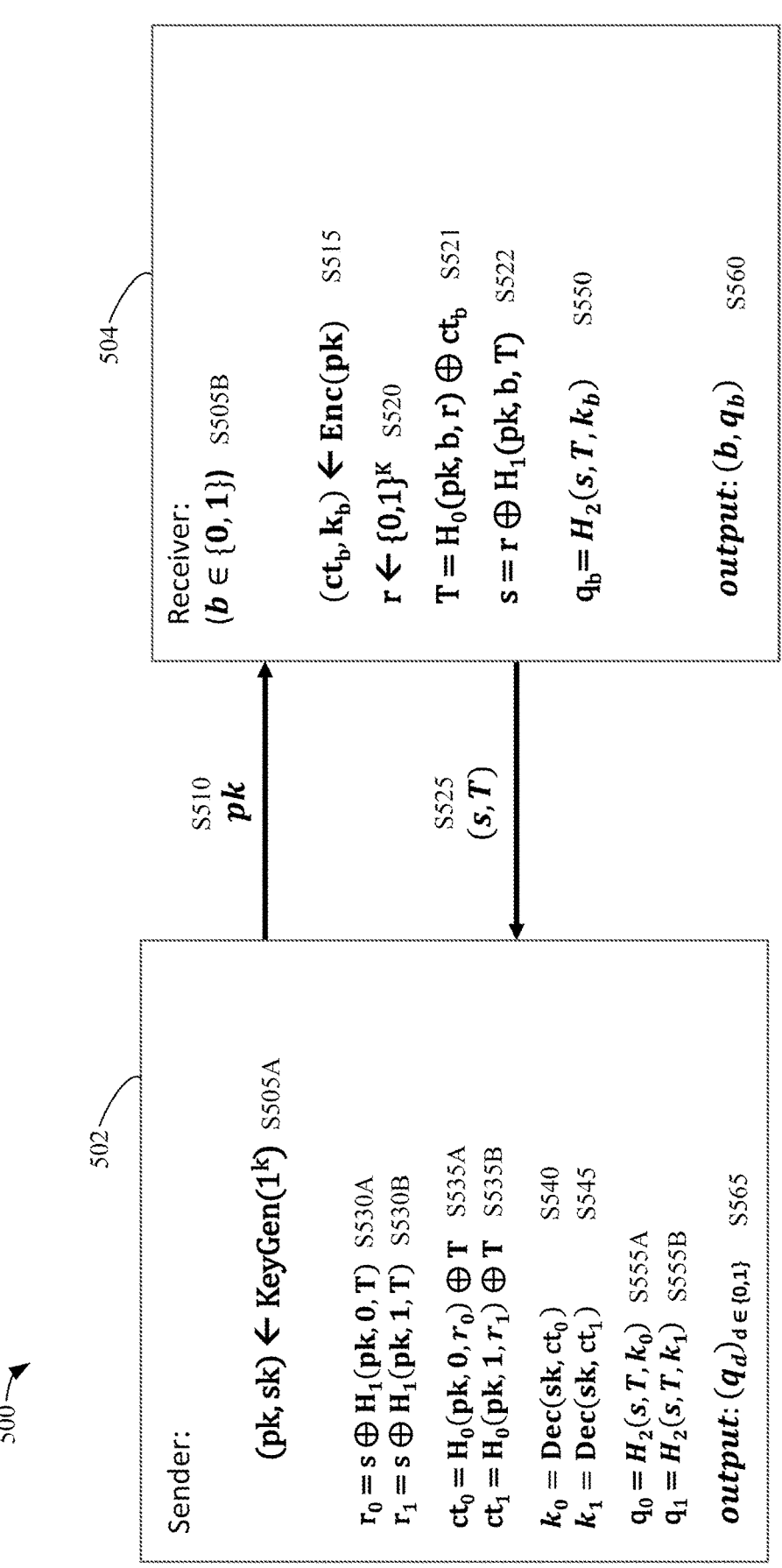
FIG. 5 shows a second oblivious transfer ($OT_2$) flow diagram of establishing an efficient OT channel using key encapsulation mechanism (KEM).

FIG. 5 shows a second oblivious transfer $(OT_2)$ flow diagram 500 of a sender computer 502 and a receiver computer 504 establishing an efficient oblivious transfer channel or correlation using key encapsulation mechanism (KEM). The second oblivious transfer $(OT_2)$ protocol is split into two phases: a registration phase and a protocol phase. In the registration phase, the receiver computer 504 can register the public key (pk). This phase is in steps S505A, S505B, and S510. The registration phase can be similar to the $OT_1$'s registration phase. In the protocol phase, the sender computer 502 and the receiver computer 504 establishes OT correlation. This phase is in steps S515 to S565. The OT protocol can employ public key cryptographic techniques and hash function to ensure that the sender computer 502 does not identify the choice bit b while the receiver computer 504 does not identify an encapsulated key $(k_{1-b})$. The protocol phase of the $OT_2$ uses a different hashing process to determine an encapsulated key $k_0$ and an encapsulated key $k_1$ than the $OT_1$, which are further described in details below.

Steps S505A to S510 can be similar to steps S405A to S410. For example, in step S505A and S505B, the sender can generate a private, public key pair (sk, pk), and the receiver can choose a choice bit b. In step S510, the sender computer 502 can provide the public key (pk) so it is accessible to the receiver computer 504. For example, sender computer 502 can publish the public key (pk) on a public server (e.g., internet or public key infrastructure) that is accessible to multiple parties including the receiver computer 504, in which the receiver computer 504 can obtain.

In step S515, the receiver computer 504 can perform an encapsulation using the public key (pk) to generate an encapsulated key $(k_b)$ and a first ciphertext $(ct_b)$, where the encapsulated key $(k_b)$ can be generated at random and the ciphertext $(ct_b)$ is a public key encryption of the encapsulated key $(k_b)$ using the public key (pk).

In step S520, the receiver computer 504 can sample a random value (r).

In step S521, the receiver computer 504 can generate an intermediate value T by performing a first function on a first hash output in conjunction with the ciphertext $(ct_b)$. The first hash output can be obtained by using a hash function $H_{0( )}$ on the public key (pk), the choice bit b, and the random value (r). The first function operators can be any invertible operators such as addition, multiplication, subtraction, division, XOR, etc.

In step S522, the receiver computer 504 can generate an intermediate value s performing a second function on the random value (r) and a second hash output. The second hash output can be obtained by using a hash function $H_{1()}$ on the public key (pk), the choice bit b, and the intermediate value T. The second function operators can be any invertible operators such as addition, multiplication, subtraction, division, XOR, etc.

In step S525, the receiver computer 504 can send the intermediate value (s) and the intermediate value (T) to the sender computer 502.

In step S530A, the sender computer 502 can obtain a random value ($r_0$) by performing a third function on the intermediate value (s) and a third hash output. In some embodiments, the random value ($r_0$) can be called an intermediate value ($r_0$). The third hash output can be obtained by using the hash function $H_{1()}$ on the public key (pk), a bit value 0, and the intermediate value T. In step S530B, the sender computer 502 can obtain a random value ($r_1$) by performing the third function on the intermediate value (s) to a fourth hash output. In some embodiments, the random value ($r_1$) can be called an intermediate value ($r_1$). The fourth hash output can be obtained by using the hash function $H_{1()}$ on the public key (pk), a bit value 1, and the intermediate value T. The third function operator can be any invertible operators such as addition, multiplication, subtraction, division, XOR, etc. that is inversion of the second function operator. For example, if the second function operator is an addition, then the third function operator is a subtraction.

In step S535A, the sender computer 502 can obtain a ciphertext ($ct_0$) by performing a fourth function on the intermediate value T in conjunction with a fifth hash output. The fifth hash output can be obtained by using the hash function $H_{0()}$ on the public key (pk), the bit value 0, and a random value ($r_0$). The fourth function operator can be any invertible operators such as addition, multiplication, subtraction, division, XOR, etc. that is inversion of the first function operator. For example, if the first function operator is an addition, then the fourth function operator is a subtraction.

In step S535B, the sender computer 502 can obtain a ciphertext $ct_1$ by performing the fourth function on the intermediate value T in conjunction with a sixth hash output. The sixth hash output can be obtained by using the hash function $H_{0()}$ on the public key (pk), the bit value 1, and a random value ($r_1$). The ciphertext ($ct_b$) of the receiver computer 504 can either have the value of the ciphertext ($ct_0$) or the ciphertext ($ct_1$) depending on the choice bit b.

In step S540, the sender computer 502 can decapsulate the ciphertext ($ct_0$) using the secret key (sk) to generate a encapsulated key ($k_0$). In step S545, the sender computer 502 can decapsulate the ciphertext ($ct_1$) using the secret key (sk) to generate an encapsulated key ($k_1$). The encapsulated key ($k_b$) of the receiver computer 504 can either have the value of the encapsulated key ($k_0$) or the encapsulated key ($k_1$) depending on the choice bit b.

Once the sender computer 502 generates the encapsulated keys ($k_0$, $k_1$) and the receiver computer generates the encapsulated key ($k_b$), the sender computer 502 can output the encapsulated keys ($k_0$, $k_1$) as outputs while the receiver computer 504 can output the encapsulated key ($k_b$) along with the choice bit b as outputs. These outputs can be used in MPC protocols, similar to how the cryptographic keys were used in FIG. 3.

In some embodiments, the sender computer 502 and the receiver computer 504 can add extra layer of security by hashing the encapsulated keys with a hash function $H_{2()}$.

In step S550, the receiver computer 504 can use the hash function $H_{2()}$ on the intermediate value s, the intermediate value T, and the encapsulated key ($k_b$) to generate a session key ($q_b$).

In step S560, the receiver computer 404 can output the choice bit b and the session key ($q_b$) for use in MPC protocols.

In step S555A, the sender computer 502 can use the hash function $H_{2()}$ on the intermediate value (s), the intermediate value (T), and the encapsulated key ($k_0$) to generate a session key ($q_0$).

In step S555B, the sender computer 502 can use the hash function $H_{2()}$ on the intermediate value (s), the intermediate value (T), and the encapsulated key ($k_1$) to generate a session key ($q_1$).

In step S565, the sender computer 502 can output the session key ($q_0$) and the session key ($q_1$) for use in MPC protocols.

The session key ($q_b$) of the receiver computer 504 can either have the value of the session key ($q_0$) or the session key ($q_1$) depending on the choice bit b. The sender computer 502 does not know the value of the choice bit b while the receiver computer 504 does not know the value of a session key ($q_{1-b}$).

C. Advantages of Key Encapsulation Mechanism

The key encapsulation OT protocols in FIG. 4 and FIG. 5 can be a non-interactive oblivious transfer (NIOT) in which a sender computer generates a private, public key pair (sk, pk) that is independent of its inputs or generated OT correlations. Therefore, when the sender computer sends the public key (pk) to the receiver computer, the receiver computer can use the same public key (pk) multiple times to generate independent OT correlations. For example, if the receiver computer already has a public key (pk) from establishing OT correlations in the past, the receiver computer does not need to obtain a new public key (pk) to establish new OT correlations, but rather reuse the public key (pk) to establish new OT correlations. This can lead to less communication and resources being shared between the sender computer and the receiver computer, creating efficient oblivious transfers that are useful in multi-party computations that require a large number of OT correlations.

The OT protocol can further be extended when exchanging messages between the sender computer and the receiver computer in an MPC protocol. If the sender computer has a first message ($m_0$) and a second message ($m_1$), and the receiver computer has a choice bit b to learn a message ($m_b$) of the sender computer, then the sender computer can use the encapsulated keys ($k_0$) and ($k_1$) to generate a first encrypted message ($m'_0$) and a second encrypted message ($m'_1$), and send it to the receiver computer. The receiver computer, having only the encapsulated key ($k_b$), can only decrypt the encrypted message ($m'_b$) with the encapsulated key ($k_b$) to learn the message ($m_b$). Therefore, if the choice bit b is 0, the receiver computer can decrypt only the first encrypted message ($m'_0$), and if the choice bit b is 1, the receiver computer can decrypt only the second encrypted message ($m'_1$). Since the receiver computer does not have the other encapsulated key ($k_{1-b}$), the receiver computer is unable to decrypt an encrypted message ($m'_{1-b}$). The OT protocol allows the sender computer to be ensured that the receiver computer learns only one of the messages ($m_b$), and the receiver computer to be ensured that the sender computer does not know the choice bit b. In some embodiments, the sender computer and the receiver computer can use the session keys ($q_b$, $q_0$, and $q_1$) to perform an MPC protocol.

The embodiment has several advantages. One advantage is that the embodiment constructs a non-interactive OT (NIOT), in which a sender computer generates a public, secret key pair (pk, sk) that is independent of its input or generated OT correlations, and can be reused to establish multiple OT correlations. For example, the sender computer's public key (pk) can be reused to establish multiple OT correlations instead of generating a new public key (pk) for every OT correlation. This means that there is only one round of communication between the sender computer and the receiver computer (e.g., step S330) when generating a new OT correlation, creating efficient oblivious transfers that are useful in multi-party computations that require a large number of OT correlations. Another advantage is that the embodiment can publish the public key (pk) on a public server that the receiver computer can retrieve. Therefore, even when the receiver computer needs a public key (pk) from the sender computer to start establishing OT correlations, there does not need to be a direct communication between the sender computer and the receiver computer, making the embodiment even more efficient.

V. OBLIVIOUS TRANSFERS USING KEM

Methods described herein may be totally or partially performed with a computer system including one or more processors, which can be configured to perform the steps. Thus, embodiments are directed to computer systems configured to perform the steps of any of the methods described herein, potentially with different components performing a respective step or a respective group of steps. The first oblivious transfer $(OT_1)$ implementation in FIG. 4 and the second oblivious transfer $(OT_2)$ implementation in FIG. 5 may be carried out using the aspect methods disclosed in greater detail with reference to FIGS. 6 and 7.

The first oblivious transfer $(OT_1)$ can have a first receiver value to be a random value $r_{1-b}$, a second receiver value to be an intermediate value $r_b$, a first hash function to be a hash function $H_b$, a second hash function to be a hash function $H_0$, and a third hash function to be hash function $H_1$. The hash function $H_b$ can be the hash function $H_0$ or the hash function $H_1$ depending on a choice bit b. Additionally, a first sender value can be a ciphertext $ct_0$ and a second sender value can be a ciphertext $ct_1$.

The second oblivious transfer $(OT_2)$ can have a first receiver value to be an intermediate value s, a second receiver value to be an intermediate value T, a random value to be a random value r, a first hash function to be a hash function $H_0$, and a second hash function and a third hash function to be a hash function $H_1$. Additionally, a first sender value can be an intermediate value $r_0$ and a second sender value can be an intermediate value $r_1$.

A. Sender Computer

Figure 6:
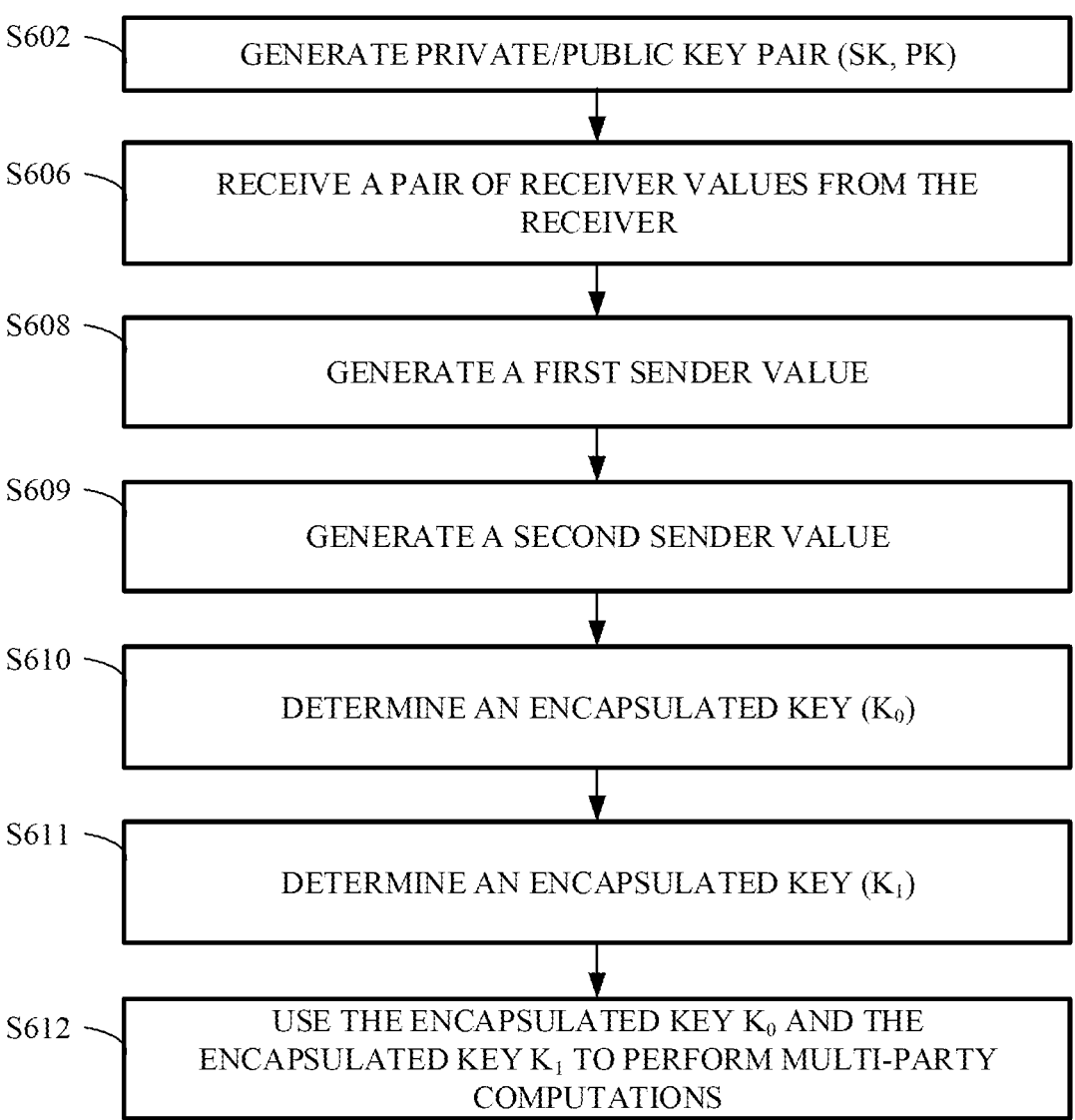
FIG. 6 shows a flow chart of establishing an efficient OT channel on a server computer's side.

FIG. 6 shows a flow chart of establishing an efficient oblivious transfer channel by the sender computer, which can be on the server side. Method 600 can be performed by the sender computer receiving a pair of receiver values from the receiver computer to generate a pair of encapsulated keys $(k_0, k_1)$. The method 600 can be performed by the sender computer 402 for the first oblivious transfer $(OT_1)$ and can be performed by the sender computer 502 for the second oblivious transfer $(OT_2)$.

In step S602, the sender computer can generate a private, public key pair (sk, pk) using a cryptographic function. The generated private, public key pair (sk, pk) can be independent from its inputs or generated OT correlations, and can be reused multiple times to establish multiple OT correlations.

The sender computer can then provide the public key (pk) so it is accessible to the receiver. For example, the sender computer can publish the public key (pk) on a public server (e.g., internet or public key infrastructure) where multiple parties including the receiver computer can retrieve the public key. The sender computer may use a public key encryption algorithm to generate both the private key (sk) and the public key (pk). The operation performed in step S602 may correspond to steps S405A and S410, and steps S505A and S510.

In step S606, the sender computer can receive a pair of receiver values. The receiver computer can generate a first receiver value of the pair of receiver values by including a random value. The receiver computer can generate a second receiver value of the pair of receiver values by applying a first function to a ciphertext $(ct_b)$ and a first hash output. The first hash output can be generated from using a first hash function on at least the public key (pk) and the random value. The receiver computer can generate the ciphertext $(ct_b)$ by performing an encapsulation on the public key (pk), where the public key (pk) can encrypt an encapsulated key $(k_b)$ to generate the ciphertext $(ct_b)$. This operation performed by the sender computer in step S606 may correspond to step S430 or step S525.

In step S608, the sender computer can generate a first sender value by using a second hash function, the first receiver value, the second receiver value, and the public key according to a choice bit b being 0. The operation performed in step S608 may correspond to step S434A or step S530A.

In step S609, the sender computer can generate a second sender value by using a third hash function, the first receiver value, the second receiver value, and the public key according to a choice bit b being 1. The operation performed in step S609 may correspond to step S434B or step 530B.

In step S610 and S611, the sender computer can determine an encapsulated key $(k_0)$ and an encapsulated key $(k_1)$. The sender computer may not know which generated encapsulated key corresponds to an encapsulated key $(k_b)$ of the receiver computer, as the sender computer does not know the receiver computer's choice bit b.

In step S610, the sender computer can determine the encapsulated key $(k_0)$ by using at least the secret key (sk) and the first sender value. The encapsulated key $(k_b)$ can be the encapsulated key $(k_0)$ if the choice bit b is 0. The operation performed in step S610 may correspond to step S435 or step S540.

In step S611, the sender computer can determine the encapsulated key $(k_1)$ by using at least the secret key (sk) and the second sender value. The encapsulated key $(k_b)$ can be the encapsulated key $(k_1)$ if the choice bit b is 1. The operations performed in step S611 may correspond to steps S440 or step S545.

In step S612, the encapsulated keys $(k_0$ and $k_1)$ can be used to perform a multi-party protocol on the sender computer's side. For example, the multi-party computation protocol may involve securely exchanging messages between the two mistrusting parties (e.g., the sender computer and the receiver computer). A first party may have messages $m_0$ and $m_1$, and a second party may want to obtain message $m_b$ without revealing the choice bit b. In such case, the OT correlation can be established between the two parties such that the first party is a sender computer, and the second party is a receiver computer. The sender computer can encrypt the messages $m_0$ and $m_1$ with a encapsulated key $(k_0)$ and a encapsulated key $(k_1)$ respectively to generate encrypted messages $m'_0$ and $m'_1$. The encrypted messages can be sent to the receiver computer, where the receiver computer would only be able to decrypt an encrypted message m'$_b$ with an encapsulated key k$_b$ to obtain a message m$_1$. Therefore, the encapsulated keys (k$_0$ and k$_1$) can be used in a secure data exchange of a multi-party protocol.

B. Receiver Computer

Figure 7:
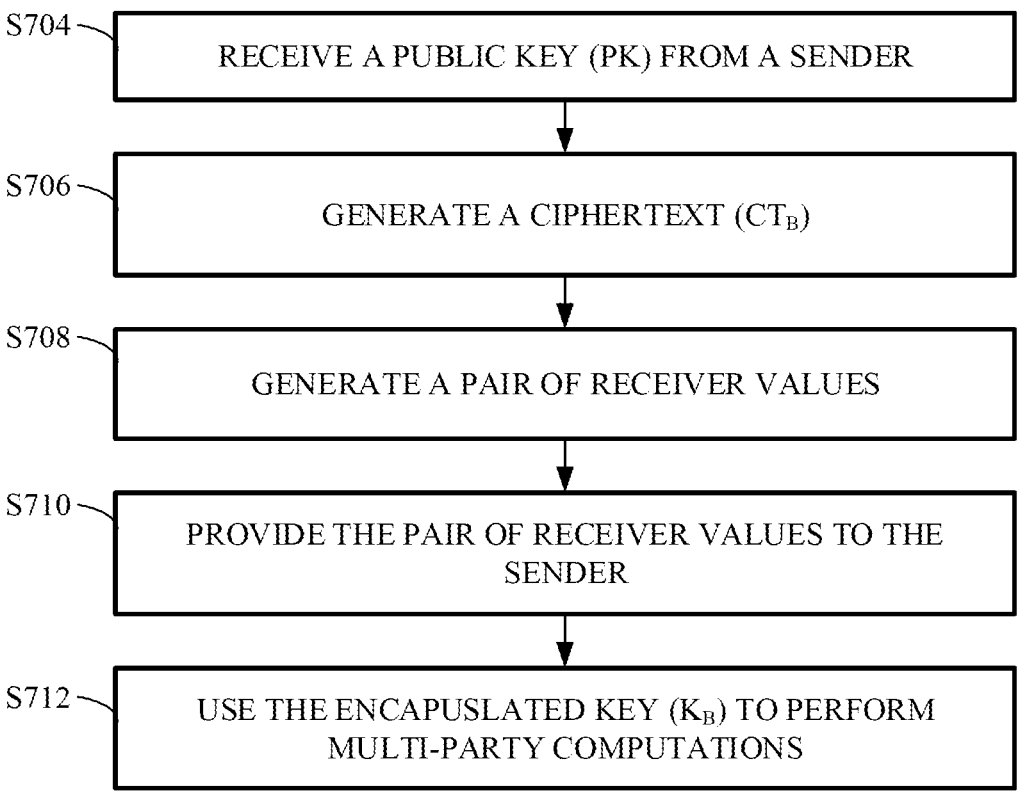
FIG. 7 shows a flow chart of establishing an efficient OT channel on a receiver computer's side.

FIG. 7 shows a flow chart of establishing an efficient oblivious transfer channel on a receiver computer side. Method 700 shows a receiver computer receiving a public key (pk) from the receiver computer, generating and sending receiver values (r$_0$, r$_1$) to the sender computer, and generating an encapsulated key (k$_b$). The method 700 can be performed by the receiver computer 404 for the first oblivious transfer (OT$_1$) and can be performed by the receiver computer 504 for the second oblivious transfer (OT$_2$).

In step S704, the receiver computer can obtain a public key (pk) that is publicly accessible. For example, the receiver computer can obtain the public key (pk) from a public server (e.g., internet and public key infrastructure) that the sender computer published its public key (pk) in. The public key (pk) can be part of the private, public key pair (sk, pk) the sender computer generated. In some embodiments, the public key (pk) can be sent directly by the sender computer to the receiver computer. The operation performed in step S704 may correspond to step S410 or step S510.

In step S706, the receiver computer can compute a ciphertext (ct$_b$) using an encapsulated key k$_b$, the public key (pk) and a choice bit b. The encapsulated key (k$_b$) is generated at random from the encapsulation of the public key (pk), and the ciphertext ct$_b$ is a public key encryption of the first encapsulated (k$_b$) using the public key (pk). The operation performed in step S706 may correspond to step S415 or step S515.

In step S708, the receiver computer can generate a pair of receiver values. A first receiver value of the pair of receiver values can include a random value. A second receiver value of the pair of receiver values can include applying a first function to a first hash output and the ciphertext ct$_b$. The first hash output can be generated from using a first hash function on the public key (pk) and the random value. The operations performed in step S708 may correspond to steps S420 and S425, or steps S521 and S522.

In step S710, the receiver computer can provide the pair of receiver values to the sender computer. The sender computer, upon receiving the pair of receiver values, can configure to determine an encapsulated key k$_0$ and an encapsulated key k$_1$ using the secret key sk and corresponding sender values. The corresponding sender values are generated by using corresponding hash functions, the first receiver value, the second receiver value, and the public key pk according to a choice bit b. For example, the encapsulated key k$_0$ can be generated using the secret key and a first sender value. The first sender value can be generated using a second hash function, the first receiver value, and the public key pk according to a choice bit b being 0. The operations performed in step S710 may correspond to step S430 or step S525.

In step S712, the encapsulated key (k$_b$) and the choice bit b can be used to perform a multi-party protocol on the receiver computer's side. For example, the multi-party computation protocol may involve securely exchanging messages between the two mistrusting parties (e.g., the sender computer and the receiver computer). A first party may have messages m$_0$ and m$_1$, and a second party may want to obtain message m$_b$ without revealing the choice bit b. In such case, the OT correlation can be established between the two parties such that the first party is a sender computer, and the second party is the receiver computer. The sender computer can encrypt the messages m$_0$ and m$_1$ with the encapsulated key k$_0$ and the encapsulated key k$_1$ respectively to generate encrypted messages m'$_0$ and m'$_1$. The encrypted messages can be sent to the receiver computer, where the receiver computer would only be able to decrypt an encrypted message m'$_b$ with the encapsulated key k$_b$, depending on the choice bit b to obtain a message m$_b$. Therefore, the encapsulated key k$_b$ can be used in a secure data exchange of a multi-party protocol.

VI. AUTHENTICATION

When studying OT protocols we typically assume that they are run over channels which ensure the integrity and safe delivery of message between the expected parties. However, when deploying such protocols in practice such channels may not exist. Building channels that provide these properties is a vital aspect in the study of secure key-exchange protocols. In fact, the Universal Composability (UC) framework of our security definitions thus far was initially defined with a view towards settings such as secure and authenticated channels, [Bellare et al., in 30th ACM STOC, pages 419-428, ACM Press, May 1998; Ran Canetti and Hugo Krawczyk, EURO-CRYPT 2002, volume 2332 of LNCS, pages 337-351, Springer, Heidelberg, April/May 2002]. Here we revisit this work and extend it to our setting.

First we recall the authenticated and unauthenticated links models, AM and UM respectively. In the AM model there exist n parties P$_1$, . . . , P$_n$ running a protocol $\Pi$. An adversary is able to activate instances of $\Pi$ between parties and control the corresponding communication. In this model it is assumed that the adversary will deliver messages faithfully, that is, if a message is intended for party P$_i$ it will be delivered correctly to that party. In the UM model the adversary is permitted to drop, inject and alter the messages exchanged between parties. In the following, we use $\mathcal{A}$ $_M$ or $\mathcal{A}$ to denote an adversary in the AM model and $\mathcal{A}$ $_{UM}$ for an adversary in the UM model.

Definition 3.1 For two protocols $\Pi$ and $\Pi'$ for n parties we say that $\Pi'$ emulates $\Pi$ in the UM model if for any ppt adversary $\mathcal{A}'$ $_{UM}$ in the UM model, there exists a ppt adversary $\mathcal{A}$ $_M$ in the AM model such that for any ppt environment D and any polynomial size auxiliary input z $$|Pr[D(z, (\mathcal{A}_{AM})_{\Pi}) = 1] - Pr[D(z, (\mathcal{A}'_{UM})_{\Pi'}) = 1]| = negl,$$

where all algorithms receive input 1$^\kappa$.

To transform any protocol secure in the AM model into one secure in the UM, we make use of an authenticator which provides the additional security guarantees required.

Definition 3.2 [BCK98, Definition 2] A compiler $\mathcal{C}$ is an algorithm that takes as input descriptions of protocols and outputs descriptions of protocols. An authenticator is a compiler $\mathcal{C}$ where for any protocol $\Pi$, the protocol $\mathcal{C}$ ($\Pi$) emulates $\Pi$ in the UM model.

An authenticator can ensure the authenticity of all protocol messages. In the following, we pursue a more modular approach in which we define a certification functionality enables the authentication individual messages. From the certification functionality, we can easily construct an authenticator.

A. Certification Functionalities from PKI

The model of Canetti et al. [Ran Canetti et al., PKC 2016, Part II, volume 9615 of LNCS, pages 265-296, Springer, Heidelberg, March 2016] studies authenticated channels in the context of a global PKI. They define a global functionality $\overline{\mathcal{F}}_{bb}$ (see FIG. 8) that they call a global bulletin board which models a PKI in the global UC (GUC) setting [Canetti et al., *TCC* 2007, volume 4392 of *LNCS*, pages 61-85, Springer, Heidelberg, February 2007]. Further, they define a global certification functionality $\overline{\mathcal{F}}_{cert}$ that allows us to certify and verify messages. We use an adapted version which is defined in FIG. 9. $\overline{\mathcal{F}}_{cert}$ can be instantiated using a signature scheme [Ran Canetti et al., *PKC* 2016, *Part II*, volume 9615 of *LNCS*, pages 265-296, Springer, Heidelberg, March 2016]. For their realization of $\overline{\mathcal{F}}_{cert}$ based on signatures, they sign the session id sid. While this works fine in the UC model and helps to prevent replay attacks, in a real protocol the security crucially relies on the uniqueness of the session id among all sessions.

We use sid only to link different parts of a protocol together such that the parties can link a message to a message in the protocol description. This brings the advantage that the security does not depend on the availability of a unique session id. The disadvantage of this approach is that $\overline{\mathcal{F}}_{cert}$ allows certifying messages but does not prevent replay attacks. We follow Bellare et al. [Bellare et al., in 30*th ACM STOC*, pages 419-428, ACM Press, May 1998] to resolve this issue. We use authenticators that use message certification as a building block to achieve full security in the UM model. These authenticators prevent replay attacks by sending a challenge nonce N.

Using $\overline{\mathcal{F}}_{cert}$ for message certification leads to transferable or undeniable authentication since everyone can verify messages [Ran Canetti et al., *PKC* 2016, *Part* 1, volume 9615 of *LNCS*, pages 265-296, Springer, Heidelberg, March 2016].

In FIG. 10, we define a session-based certification functionality $\overline{\mathcal{F}}_{cs}$. $\overline{\mathcal{F}}_{cs}$ does not have the transferability property since only the sender and receiver of a message can verify the certificate. We follow the UC with joint state (JUC) [Ran Canetti and Tal Rabin, *CRYPTO* 2003, volume 2729 of *LNCS*, pages 265-281, Springer, Heidelberg, August 2003] model. In this model, there are subsessions that share a joint state. This is useful for an efficient KEM and MAC-based authenticator, where the same MAC key is used for authenticating multiple messages. Instead of calling it a subsession, we use a message id mid which is unique for each message. Again mid only serves as a method to link messages of a protocol together.

In FIG. 11, we show a protocol that realizes $\overline{\mathcal{F}}_{cs}$ based on a KEM and a MAC.

Theorem 3.3 Let $\Pi$ be the protocol in FIG. 11, KEM be IND-CPA secure and correct and MAC EU-CMVA secure and correct. Then, for any ppt adversary $\mathcal{A}$ in the UM model, there exists a ppt adversary $\mathcal{A}'$ in the UM model such that for any ppt environment D and any polynomial size auxiliary input z $$\left| Pr[D(z, (\mathcal{A}_{UM})_\Pi) = 1] - Pr[D(z, (\mathcal{A}'_{UM})_{\overline{\mathcal{F}}_{cs}}) = 1] \right| = negl,$$

where all algorithms receive input $1^k$.

Proof Given $\mathcal{A}$, we construct $\mathcal{A}'$. First notice that environment D can only distinguish $\mathcal{A}$ from $\mathcal{A}'$ in two ways: First, when $\mathcal{A}$ creates a valid pair (m, $\tau$) for which m, $\sigma$ with $\sigma=\tau$ has not been recorded as (v, w, m, $\sigma$, 1) by $\mathcal{A}'_{cs}$ (where v is a public key and w an encapsulation of the random coins of the MAC key generation). Second, when the correctness of KEM or MAC fails.

In case $\mathcal{A} = P_c$ or $\mathcal{A} = P_v$, constructing $\mathcal{A}'$ is easy. We let $\mathcal{A}'$ interact with $\mathcal{A}$. $\mathcal{A}'$ either chooses pk and sends it to $\mathcal{A}$ ($\mathcal{A} = P_v$) or $\mathcal{A}'$ chooses and sends the encapsulation ($\mathcal{A} = P_c$). In both cases $\mathcal{A}'$ knows k, can verify (m, $\tau$) and force $\mathcal{A}'_{cs}$ to record (v, w, m, $\tau$, 1) when (m, $\tau$) is valid. This only fails when the correctness fails.

The non-trivial case is when $\mathcal{A} \not\in (P_c, P_v)$. In this case, we define a sequence of hybrids $\mathcal{A}'$, $\mathcal{A}'_2$. $\mathcal{A}'_1$ follows the protocol by following the description of $P_c$ and $P_v$. $\mathcal{A}'_2$ is identical to $\mathcal{A}'_1$ except that he replaces ct, which encapsulates k, with an encapsulation of a uniform key $k_u$. Notice that pk is authenticated using $\overline{\mathcal{F}}_{cert}$. Therefore $\mathcal{A}$ cannot manipulate pk.

Let KEM be $\epsilon_{KEM}$ IND-CPA secure, then, conditioned on $\mathcal{A} \not\in (P_c, P_v)$, $$\left| Pr[D(z, (\mathcal{A}_{UM})_\Pi) = 1 - Pr[D(z, (\mathcal{A}'_{2,UM})_\Pi) = 1] \right| \le \epsilon_{KEM}.$$

Now, the communication transcript between $P_c$ and $P_v$ is independent of MAC key k and we can exploit the EU-CMVA security of MAC. In the EU-CMVA game, we can request arbitrary tags and win if we can forge a new tag. Our final adversary $\mathcal{A}'$ generates the start certified session messages as $\mathcal{A}_2$, does with the exception that he looks up pk from $\overline{\mathcal{F}}_{bb}$. For the certify message and verify message phase, he uses the tag and verification queries in the EU-CMVA game to simulate $P_c$ and $P_v$. More specifically, whenever $P_c$ requests a tag for m from $\overline{\mathcal{F}}_{cs}$, he makes a tag query for m and sends $\sigma=\tau$ to $\overline{\mathcal{F}}_{cs}$. Further, he uses (m, $\tau$) as message for $\mathcal{A}$. Whenever $P_v$ makes a query (m, $\tau$). $\mathcal{A}'$ checks whether $\tau$ has been a response to a tag query. If not, he makes a verification query. If the verification fails, $\overline{\mathcal{F}}_{cs}$ answers also with 0 since this query has not been recorded. If the verification succeeds, D might distinguish $\mathcal{A}'$ from $\mathcal{A}$ but $\mathcal{A}'$ breaks the EU-CMVA security.

Let MAC be $\epsilon_{MAC}$ EU-CMVA secure. Then, conditioned on $\mathcal{A} \not\in (P_c, P_v)$, $$\left| Pr[D(z, (\mathcal{A}_{2,UM})_\Pi) = 1] - Pr[D(z, (\mathcal{A}'_{UM})_{\overline{\mathcal{F}}_{CS}}) = 1] \right| \le \epsilon\ MAC.$$

Let MAC and KEM both be $\delta$-correct. Then $$\left| Pr[D(z, (\mathcal{A}_{UM})_\Pi) = 1] - Pr[D(z, (\mathcal{A}'_{UM})_{\overline{\mathcal{F}}_{CS}}) = 1] \right| \le \epsilon_{MAC} + \epsilon_{KEM} + 2\delta.$$

B. Party-Specific Authenticators

In existing UC models for secure channels all parties are assumed to be equal. That is any party can have the role of the protocol initiator. In protocols for entity authentication it may be the case that we only wish to ensure unilateral authentication, or in the case of mutual authentication, the method of authentication in either direction may be different.

We extend the previous model for authenticated and unauthenticated channels to consider both unilateral and mutual authentication. Within a single session of a protocol, one party can be designated the role of initiator and the other the responder. In the case of unilateral authentication, we split the set of all parties into those that are authenticated and those that are unauthenticated. We call this model the $AM^+$ model. We use $AM^+_{\mathbb{P}}$ to denote the setting in which the adversaries delivers the messages of parties $P \notin \mathbb{P}$ faithfully. For any party $P \in \mathbb{P}$, the adversary is allowed to drop, inject and alter messages send by this party.

First, we adapt Definition 3.1 to our $AM^+$ model.

Definition 3.4 For two protocols $\Pi$ and $\Pi'$ between parties $(P_1, \ldots, P_n)$, we say that $\Pi'$ emulates $\Pi$ in the $AM^+_{\mathbb{P}}$ model where $\mathbb{P} \subseteq (P_1, \ldots, P_n)$ if for any ppt adversary $\mathcal{A}'$ in the $AM^+_{\mathbb{P}}$ model, there exists a ppt adversary $\mathcal{A}$ in the AM model such that for any ppt environment D and any polynomial size auxiliary input z $$\left| Pr[D(z, (\mathcal{A}_{AM})_{\Pi}) = 1] - Pr\left[D\left(z, \left(\mathcal{A}'_{AM^+_{\mathbb{P}}}\right)_{\Pi'}\right) = 1\right]\right| = negl,$$

where all algorithms receive input $1^\kappa$.

We define a party-specific authenticator following Definition 3.2 to transform any protocol secure in the AM model into one secure in the $AM^+$ model, we make use of an authenticator which provides the additional security guarantees required.

Definition 3.5 A compiler $\mathcal{C}^+_{\mathbb{P}}$ is an algorithm that takes for input descriptions of protocols and outputs descriptions of protocols. An authenticator is a compiler $\mathcal{C}^+_{\mathbb{P}}$ where for any protocol $\Pi$ with parties $(P_1, \ldots, P_n)$ secure in the AM model and $\mathbb{P} \subseteq (P_1, \ldots, P_n)$, the protocol $\mathcal{C}^+_{\mathbb{P}}(\Pi)$ emulates $\Pi$ in the $AM^+_{\mathbb{P}}$ model.

Notice that when $\mathbb{P} = (P_1, \ldots, P_n)$, the $AM^+_{\mathbb{P}}$ model is equivalent with the UM model while when $\mathbb{P} = \emptyset$ it is equivalent with the AM model.

In FIG. 12 and FIG. 13, we show party specific compilers for a party A. One authenticates individual messages while the other authenticates all messages sent by A during a whole session which causes less overhead. Both authenticators are basically the authenticators of [Bellare et al., in 30th ACM STOC, pages 419-428, ACM Press, May 1998] adapted to our certification functionalities. As in [Bellare et al., in 30th ACM STOC, pages 419-428, ACM Press, May 1998], the round complexity can be compressed by sending the nonce together with the previous message.

Theorem 3.6 Let $\Pi$ be a protocol between parties $(P_1, \ldots, P_n)$ that is secure in the $AM^+_{\mathbb{P}}$ model where $\mathbb{P} \subseteq (P_1, \ldots, P_n)$. Let $A = P_i$ for some $i \in [n]$ and $$C^+_A$$

be one of the two authenticators defined in FIG. 7 or 8. Then $$C^+_A(\Pi)$$

emulates $\Pi$ in the $AM^+_{\mathbb{P} \cup A}$ model.

Proof. The difference between the $AM^+_{\mathbb{P}}$ and $AM^+_{\mathbb{P} \cup A}$ model is that in the latter an adversary $\mathcal{A}$ can drop, inject or alter messages sent by A. The two models are equivalent, when $\mathcal{A} = A$ since then he can drop, inject or alter messages of A in both models. Another trivial case is when $\mathcal{A}$ is the receiver of the messages from A. In this case he might accept an injected or altered message. Again, $\mathcal{A}$ can trivially alter or inject messages for himself in both models without breaking security. Therefore, we consider in the following the case when A is neither A nor the recipient of the message that he wishes to alter or inject.

Since in $$C^+_A\left(\prod\right)$$

all messages that do not have a certificate are ignored, $\mathcal{A}$ needs to either generate certificates for his injected or altered messages or he needs to reuse previous messages with a valid certificate. Let us first consider the authenticator in FIG. 13. $\overline{\mathcal{F}}_{bb}$ uniquely binds v to A. Further, $\overline{\mathcal{F}}_{cert}$ only allows A to enter a record $(v, m, \sigma, 1)$ through a certify or verify query. Thus, $\mathcal{A}$ cannot generate a new tuple $m, \sigma$ that will not be ignored by a receiver of the message.

The receiver of a message from A will always sample a random nonce N from $\{0,1\}^\kappa$. Except with a negligible probability this nonce will collide with a previous nonce, the receiver will always expect a certificate for $(m, N)$ which forces the adversary to generate a certificate for a new message (except when the nonce collides). Therefore, we have proven the theorem statement for the authenticator of FIG. 13.

For the session-based authenticator in FIG. 12, the theorem statement follows for similar reasons. Again, the receiver of the message samples a random nonce such that $\mathcal{A}$ is forced to generate a new message that contains this nonce together with a valid certificate. There are only two parties that can enforce a recording of $(v, w, m, \sigma, 1)$ in $\overline{\mathcal{F}}_{cs}$. This must either happen through a certify or verify query to $\overline{\mathcal{F}}_{cs}$. The first party is the party that $\overline{\mathcal{F}}_{bb}$ ties to v which can only be A due to the uniqueness of v. The second party is the party P for which there is a record $(v, w, P)$. There is only one such party which is the receiver of the message from A. Thus, it is straightforward to construct an adversary $\mathcal{A}'$ from $\mathcal{A}$ which can perform the same attack in the $AM^+_{\mathbb{P}}$ model that $\mathcal{A}$ performs in the $AM^+_{\mathbb{P} \cup A}$ model.

C. Implicit Authentication for KEM-Based OT

As mentioned in the I. Introduction section, we provide a construction of OT for which the first message, which is sent from sender to receiver, can be reused. This first message will be the public key of the KEM. It is immediate that one might want to use a PKI to authenticate this public key. Since only the owner of this public key (and corresponding secret key) can decapsulate keys under this public key, this provides implicit authentication. In our case, the owner is the OT sender. When a receiver generates a message under a certified public key from a PKI, only the owner of the key can obtain the two strings of the sender. This implicit authentication is strictly weaker than the explicit authentication provided by an authenticator. An adversary might alter the OT message of the receiver such that the sender learns different OT strings. The sender will therefore have no guarantees that the correct message was delivered.

In the case of a standard KEM, explicit authentication can be achieved through the addition of a key confirmation step, where in the receiver sends back a message using the received key. Key confirmation has been widely studied in game-based definitional settings [Fischlin et al., 2016 IEEE Symposium on Security and Privacy, pages 452-469, IEEE Computer Society Press, May 2016] but is not explicitly discussed with the UC framework. In the case of OT, key confirmation seems a challenging property to obtain. On one hand, the receiver has only one of the keys and revealing which one to the sender via key confirmation would break his security. On the other hand, the sender could confirm both keys without exposing them. Nevertheless, the receiver is only able to validate one of the two. This opens the possibility for selective abort (selective failure) attacks. The sender/owner (or a man-in-the-middle adversary) can send a faulty confirmation for one of the keys, as this is dependent on the choice bit it will either go unnoticed by the receiver (since he does not know the key), or the receiver will abort since he thinks the key confirmation has failed. As a result, we do not provide a key confirmation step for OT. Implicit authentication will however be enough for many applications.

VII. NIOT FROM DENSE KEY ENCAPSULATION

A. UC Security

The $OT_1$ construction of NIOT from a dense KEM is depicted in FIG. 4. In FIG. 5, we depict the $OT_2$ construction. Theorem 4.1 and Theorem 4.4 establish their security with respect to ideal functionality $\mathcal{F}_{NIOT}$. Both constructions can be instantiated with any of the dense KEMs from Section 2.2.

Theorem 4.1 Given a dense KEM that is correct and OW-CPA-secure, then the NIOT in FIG. 9 is UC secure with respect to $\mathcal{F}_{NIOT}$ in the programmable random oracle model.

Theorem 4.2 Given a dense KEM that is correct and OW-CPA-secure, then the NIOT in FIG. 10 is UC secure with respect to $\mathcal{F}_{NIOT}$ in the programmable random oracle model.

B. Security Under Public Key Reuse

We define a new ideal functionality for the setting where the same public keys are used across different sessions. We align our definition with the UC definition with a joint state (JUC) [Ran Canetti and Tal Rabin, *CRYPTO* 2003, volume 2729 of *LNCS*, pages 265-281, Springer, Heidelberg, August 2003]. In our case the joint state is the public key which is being reused. As in JUC, a sender can start a joint state by publishing or transferring a public key. A receiver can then start a subsession under this public key to generate OT correlations. $\mathcal{F}$ We define this functionality in FIG. 14 and denote it with $\mathcal{F}_{NIOT}$. For the sake of simplicity, $\mathcal{F}_{NIOT}$ only considers a single receiver. Our security claims still hold when considering multiple receivers that are different entities.

This setting is slightly different from the global UC (GUC) setting [Canetti et al., *TCC* 2007, volume 4392 of *LNCS*, pages 61-85, Springer, Heidelberg, February 2007] where all protocols can use a single instantiation of a global functionality. In our case, each party can run multiple copies of $\mathcal{F}_{mNIOT}$ where each copy might have multiple subsessions. Nevertheless, our results in the JUC setting translate to the GUC setting when considering the public keys as part of a PKI that is modeled as a global bulletin board.

Theorem 4.3 In Theorem 4.3, we show that the construction in FIG. 4 instantiated with the CDH KEM of Section 2.2 is secure with respect to ideal functionality $\mathcal{F}_{mNIOT}$ in the AGM.

Let the CDH assumption hold over group $\mathcal{G}$. Then the NIOT in FIG. 4 instantiated with the CDH KEM in Section 2.2 is UC secure with respect to $\mathcal{F}_{mNIOT}$ in the programmable random oracle model combined with the algebraic group model.

Theorem 4.4 Let the CDH assumption hold over group $\mathcal{G}$. Then the NIOT in FIG. 5 instantiated with the CDH KEM in Section 2.2 is UC secure with respect to $\mathcal{F}_{mNIOT}$ in the programmable random oracle model combined with the algebraic group model.

Since both of the protocol use the same public key in the CDH KEM setting, a party can use the same public key to run both protocols and the security follows from the JUC composability.

VIII. EXAMPLE IMPLEMENTATIONS

We provide an implementation of the $OT_1$ (based on [Daniel Masny and Peter Rindal, *ACM CCS* 2019, pages 309-326, ACM Press, November 2019]) and $OT_2$ (based on [McQuoid et al., *ACM CCS* 2020, pages 425-442, ACM Press, November 2020]) protocol when instantiated with the CDH KEM and RSA KEM. We report the cycle and running time amount in a modular fashion such that it is easy to compare our results with previous works based on elliptic curves. We only compare our results with OT protocols in which the first message could be seen as a public key and therefore potentially reused. These two protocols are those of Chou and Orlandi [Tung Chou and Claudio Orlandi, *LATINCRYPT* 2015, volume 9230 of *LNCS*, pages 40-58, Springer, Heidelberg, August 2015] and, Canetti, Sarkar and Wang [Ran Canetti et al., *ASIACRYPT* 2020, *Part III*, volume 12493 of *LNCS*, pages 277-308, Springer, Heidelberg, December 2020]. Using the running time reported in FIG. 15, one can roughly estimate the performance and compare their efficiency. We emphasize that these performance estimates are only rough estimates based on a non-optimized implementation.

We use the relic toolkit [Aranha et al., RELIC is an Efficient LIbrary for Cryptography. https://github.com/relic-toolkit/relic] for the basic cryptographic functionalities which includes all elliptic curve operations and RSA key generation, encryption and decryption. To implement our elliptic curve based OT protocol, the operations of multiplication, addition, subtraction, hashing to a curve over an elliptic curve are sufficient. We chose the relic toolkit [Aranha et al., RELIC is an Efficient LIbrary for Cryptography. https://github.com/relic-toolkit/relic] since it provides all operations over a large set of elliptic curves. Additionally, in provides the hashing to a curve point operation which is a less standard.

We implement our protocol in a straightforward fashion without optimization. We benchmark our performance on an Intel® Core™ i5-10210U CPU @ 1.60 GHz×8 with 15 GB memory. In FIG. 15, we report the running time and cycles of our protocol and the basic group operations such as exponentiation, division and hashing into an elliptic curve. For the latter operation, we use the operation provided in [Aranha et al., RELIC is an Efficient LIbrary for Cryptography. https://github.com/relic-toolkit/relic]. For our implementation, we choose curve25519 which has been previously used in the implementations by [Tung Chou and Claudio Orlandi, *LATINCRYPT* 2015, volume 9230 of *LNCS*, pages 40-58, Springer, Heidelberg, August 2015].

We do not benchmark our results over a network. Due to the non-interactive nature of our protocol, we estimate that the impact of network delays is less significant and should not vary from previous works such as [Tung Chou and Claudio Orlandi, *LATINCRYPT* 2015, volume 9230 of

*LNCS*, pages 40-58, Springer, Heidelberg, August 2015] or [Ran Canetti et al., *ASIACRYPT* 2020, *Part III*, volume 12493 of *LNCS*, pages 277-308, Springer, Heidelberg, December 2020]. We also do not include the authentication mechanism in the benchmark in FIG. 15. The authentication mechanism is an orthogonal property that each of the OT protocols can use in a similar fashion.

We use the same hardware settings to benchmark our RSA-based OT. We report the running time and cycle amounts in FIG. 16.

Multiplications with the base generator of an elliptic curve group are significantly more efficient that with a random element. This leads to a major discrepancy between the cycle amounts of a multiplication and the key generation reported in FIG. 15. This fact benefits in particular the OT construction of Chou and Orlandi. A related hidden cost the $OT_1$ protocol comes from the requirement to sample a random group element. In Relic this is implemented in a similar fashion as for key generation and therefore causes the same computational complexity. The $OT_2$ protocol does not generate such a random element which not only decreases the communication complexity but also the running time by roughly 180K cycles.

In the $OT_1$ protocol, the receiver has to encapsulate a key, sample a random group element, hash to a group and subtract it from the encapsulation. Since the encapsulate a key procedure requires two multiplication of which one is with a random element, we need one multiplication with a random element, two multiplications with the base generator and one hash operation in total. Adding the cycles for these individual operations based on FIG. 15 results in roughly 1295K cycles which matches the receivers total running time of 1378K cycles almost, with an overhead of 83K cycles. In $OT_2$, there are almost the same operations minus generating one random element. Therefore the individual operations sum up to roughly 1146K cycles with a discrepancy of around 50K cycles compared to the cycles reported in FIG. 15.

On the sender's side, a sender has to compute two hash to a group operations and two decapsulations. Each decapsulation requires one multiplication with a random group element. This results in two multiplications with a random element and two hash operations which based on FIG. 12 totals in 1660K cycles. This has a discrepancy of 207K cycles compared to the sender's actual running time and is roughly twice the discrepancy of 83K cycles on the receiver's side. This can be explained by the fact that the sender has to do roughly twice the amount of group additions (subtractions) and standard hash operations compared to the receiver. This leads to the conclusion that the estimate of the overall running time of sender and receiver based on the individual group operations provides a realistic estimate when distinguishing different forms of multiplications and sampling random elements.

The protocol of Chou and Orlandi uses the identical key-generation procedure. On the receiver's side, it requires operations that are identical to encapsulation in the CDH KEM, which totals 816K cycles based on FIG. 15. On the sender's side, the protocol can be optimized such that he only needs to compute a single multiplication with a random element which results in around 585K cycles at the cost of requiring a precomputation of another multiplication with a random element. This would increase the computational cost of the key generation to around 816K cycles. This optimization makes sense when the first OT message (the public key) is reused.

Based on these estimates, which rely on the curve25519 implementation of the relic toolkit, the OT protocol of Chou and Orlandi is significantly faster and in case of $OT_1$ additionally requires less communication.

The CSW OT protocol achieves UC security when the first message (public key) is only used once. Their optimized variant requires a CRS, in addition to a random oracle. In their protocol, the receiver needs to compute two hash into the group operations, one multiplication with the base generator and two with a random element. Based on FIG. 12, this leads to 1892K cycles which is a 46% overhead compared to the estimate of the receiver of $OT_1$ and 65% in case of $OT_2$. The sender's key generation requires a multiplication with the base generator and one with a random element. This results in 816K cycles and an overhead of 251% compared to the estimates for the $OT_1$, $OT_2$ key generation. An optimization of the protocol requires another precomputation by the sender of two multiplications with random elements which results in a total of 1984K cycles of the sender's precomputation including key generation. This would result in an overhead of 755% for the precomputation which is typically not an issue when the first message is reused since it will be amortized over the amount of OT sessions. During the protocol, the sender needs to only compute two multiplications with random elements which results in around 1168K cycles which is only 70% of the estimate for what the $OT_1$ and $OT_2$ sender needs to compute during the protocol.

It is not straightforward to compare the CDH-based $OT_1$ and $OT_2$ with the CSW OT [Ran Canetti et al., *ASIACRYPT* 2020, *Part III*, volume 12493 of *LNCS*, pages 277-308, Springer, Heidelberg, December 2020]. The public key size is identical and $OT_2$ has roughly half the communication costs on the side of the receiver. The main difference seems to be that the CSW OT have a faster sender and a slower receiver at the cost of requiring a CRS and slightly more storage to store the precomputed elements. It seems that the best choice between CSW and MRR depends on the application. When the first message is reused, $OT_1$ and $OT_2$ are secure under discrete log in the AGM while the security of CSW remains unclear in this setting.

IX. COMPUTER SYSTEM

Figure 17:
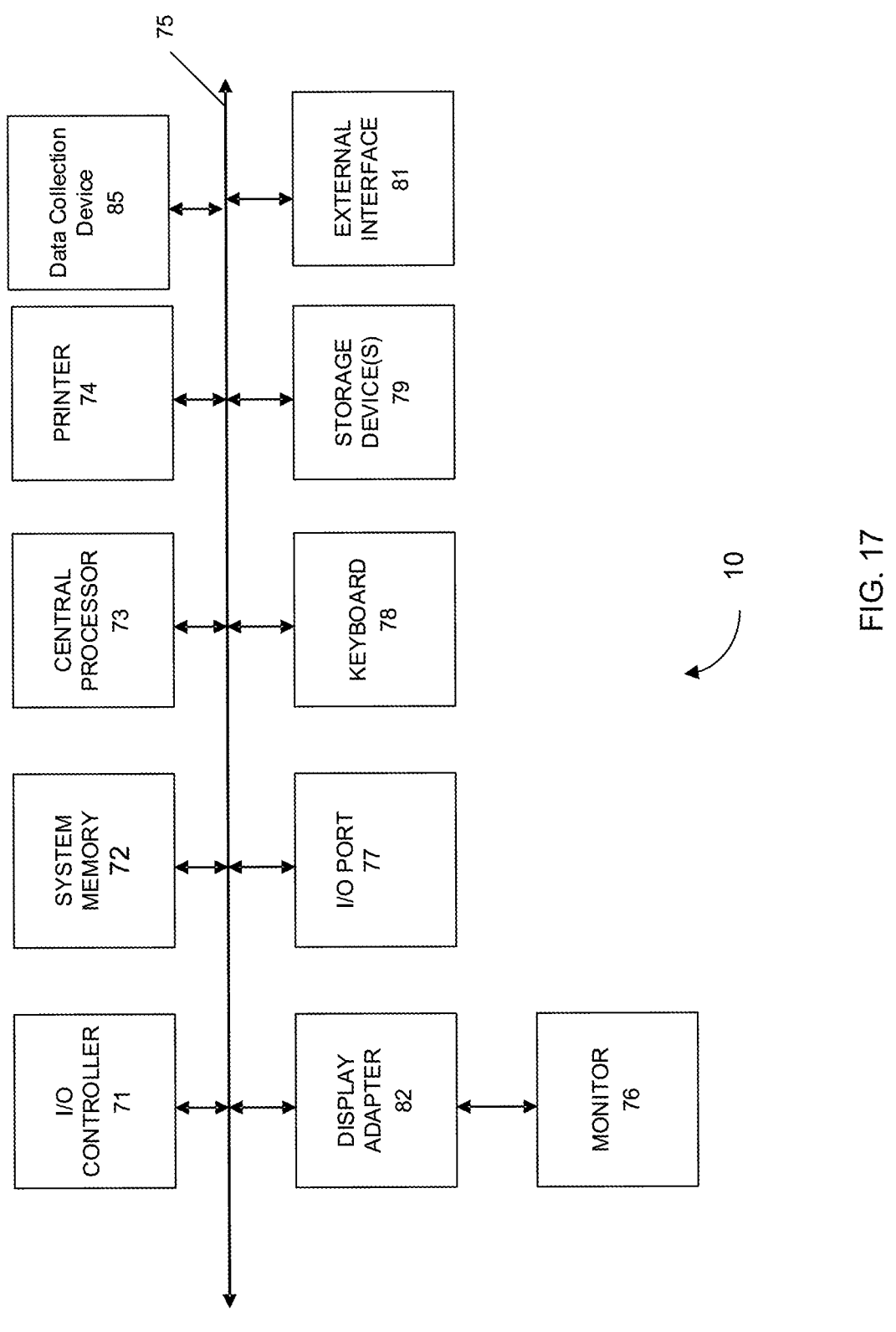
FIG. 17 shows a block diagram of an example computer system usable with systems and methods according to embodiments of the present disclosure.

Any of the computer systems mentioned herein may utilize any suitable number of subsystems. Examples of such subsystems are shown in FIG. 17 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 17 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or a network interface 81 (e.g., Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on." When a Markush group or other grouping is used herein, all individual members of the group and all combinations and subcombinations possible of the group are intended to be individually included in the disclosure.

All patents, patent applications, publications, and descriptions mentioned herein are incorporated by reference in their entirety for all purposes. None is admitted to be prior art. Where a conflict exists between the instant application and a reference provided herein, the instant application shall dominate.

What is claimed is:

1. A method for establishing an oblivious transfer channel for multi-party computations among a sender computer and a receiver computer, the method comprising performing by the sender computer:

generating a key pair including a public key pk and a secret key sk, wherein the public key pk is accessible to the receiver computer;

receiving a pair of receiver values from the receiver computer, wherein a first receiver value of the pair of receiver values includes a random value, and a second receiver value of the pair of receiver values is generated by applying a first function to (1) a first hash output generated from using a first hash function on the public key pk and the random value and (2) a ciphertext $ct_b$ generated using the public key pk;

generating a first sender value by using a second hash function, the first receiver value, the second receiver value, and the public key pk according to a choice bit b being 0;

generating a second sender value by using a third hash function, the first receiver value, the second receiver value, and the public key pk according to the choice bit b being 1;

determining an encapsulated key $k_0$ by using the secret key sk and the first sender value;

determining an encapsulated key $k_1$ by using the secret key sk and the second sender value;

using the encapsulated key $k_0$ and the encapsulated key $k_1$ to perform the multi-party computations with the receiver computer;

establishing a second oblivious transfer channel with a second receiver computer by re-using the key pair to determine a pair of additional encapsulated keys for the second receiver computer, the pair of additional encapsulated keys for use in additional multi-party computations with the second receiver computer; and encrypting a set of communications for transmission to the second receiver computer by using the pair of additional encapsulated keys, wherein the set of communications is decryptable by the second receiver computer using a corresponding encapsulated key derived from re-using the public key pk.

2. The method of claim 1, wherein the sender computer publishes the public key pk on a public server that is accessible to the receiver computer.

3. The method of claim 1, wherein the sender computer sends the public key pk directly to the receiver computer.

4. The method of claim 1, wherein the random value is a random value $r_{1-b}$, the first receiver value is the random value, the second receiver value is an intermediate value $r_b$, the first hash function is a hash function $H_b$, the second hash function is a hash function $H_0$, and the third hash function is a hash function $H_1$, wherein the hash function Hp is the hash function $H_0$ or the hash function $H_1$ depending on the choice bit b.

5. The method of claim 4, wherein the first sender value is a ciphertext $ct_0$, wherein the first sender value is generated by applying a second function to 1) the second receiver value and (2) a second hash output generated from using the second hash function on the public key pk and the first receiver value, wherein the second function is an inversion of the first function, wherein the first receiver value has a value $r_1$ and the second receiver value has an intermediate value $r_0$ according to the choice bit b being 0.

6. The method of claim 5, wherein the encapsulated key $k_0$ is generated by decapsulating the first sender value using the secret key sk.

7. The method of claim 4, wherein the second sender value is a ciphertext $ct_1$, wherein the second sender value is generated by applying a second function to 1) the second receiver value and (2) a third hash output generated from using the third hash function on the public key pk and the first receiver value, wherein the second function is an inversion of the first function, wherein the first receiver value has a value $r_0$ and the second receiver value has an intermediate value $r_1$ according to the choice bit b being 1.

8. The method of claim 7, wherein the encapsulated key $k_1$ is generated by decapsulating the second sender value using the secret key sk.

9. The method of claim 1, wherein the first receiver value is an intermediate value s, the second receiver value is an intermediate value T, the random value is a random value r, the first hash output is generated from using the first hash function on the public key pk, the choice bit b, and the random value, the first hash function is a hash function $H_0$, and the second hash function and the third hash function are hash function $H_1$.

10. The method of claim 9, wherein the first receiver value is generated by applying a second function to (1) the random value and (2) a second hash output generated from using the hash function $H_1$ on the public key pk, the choice bit b, and the second receiver value.

11. The method of claim 10, wherein the first sender value is an intermediate value $r_0$, wherein the first sender value is generated by applying a third function to 1) the first receiver value and (2) a third hash output generated from using the second hash function on the public key pk, the choice bit b of 0, and the second receiver value, wherein the third function is an inversion of the second function.

12. The method of claim 11, wherein the encapsulated key $k_0$ is generated by decapsulating a ciphertext $ct_0$ using the secret key sk, wherein the ciphertext $ct_0$ is generated by applying a fourth function to (1) the second receiver value and (2) a fifth hash output generated from using the hash function $H_0$ on the public key pk, the choice bit b of 0, and the first sender value, wherein the fourth function is an inversion of the first function.

13. The method of claim 10, wherein the second sender value is an intermediate value $r_1$, wherein the second sender value is generated by applying a third function to 1) the first receiver value and (2) a fourth hash output generated from using the third hash function on the public key pk, the choice bit b of 1, and the second receiver value, wherein the third function is an inversion of the second function.

14. The method of claim 13, wherein the encapsulated key $k_1$ is generated by decapsulating a ciphertext $ct_1$ using the secret key sk, wherein the ciphertext $ct_1$ is generated by applying a fourth function to (1) the second receiver value and (2) a sixth hash output generated from using the hash function $H_0$ on the public key pk, the choice bit b of 1, and the second sender value, wherein the fourth function is an inversion of the first function.

15. A method for establishing an oblivious transfer channel for multi-party computations among a sender computer and a receiver computer, the method comprising performing by the receiver computer:

obtaining a public key pk that is publicly accessible to the receiver computer, wherein a key pair includes the public key pk and a secret key sk generated by the sender computer;

computing a ciphertext $ct_b$ using an encapsulated key $k_b$, the public key pk, and a choice bit b selected by the receiver computer;

generating a pair of receiver values, wherein generating a first receiver value of the pair of receiver values includes a random value, and generating a second receiver value of the pair of receiver values includes applying a first function to (1) a first hash output generated from using a first hash function on the public key pk and the random value and (2) the ciphertext $ct_b$;

providing the pair of receiver values to the sender computer, wherein the sender computer is configured to determine an encapsulated key $k_0$ and an encapsulated key $k_1$ using the secret key sk and corresponding sender values, wherein the corresponding sender values are generated by using corresponding hash functions, the first receiver value, the second receiver value, and the public key pk according to the choice bit b;

using the encapsulated key $k_b$ and the choice bit b to perform the multi-party computations with the sender computer;

establishing a second oblivious transfer channel with a second sender computer by re-using the key pair to generate additional receiver values for the second sender computer to determine a pair of additional encapsulated keys for use in additional multi-party computations with the second sender computer; and decrypting a set of communications received from the second sender computer by using a corresponding encapsulated key derived from re-using the public key pk, wherein the set of communications is encrypted by the second sender computer using the pair of additional encapsulated keys.

16. The method of claim 15, wherein the encapsulated key $k_0$ and the encapsulated key $k_1$ are known only to the sender computer.

17. The method of claim 15, wherein the choice bit b is known only to the receiver computer.

18. The method of claim 15, wherein the encapsulated key $k_0$ and the encapsulated key $k_1$ are used to perform the multi-party computations with the receiver computer.

19. The method of claim 15, wherein the encapsulated key $k_0$, the first receiver value, the second receiver value, and a hash function $H_2$ are used to generate a session key $q_0$, and wherein the encapsulated key $k_1$, the first receiver value, the hash function $H_2$, and the second receiver value are used to generate a session key $q_1$ by the receiver computer.

20. The method of claim 15, wherein the encapsulated key $k_b$, the first receiver value, the second receiver value, and a hash function $H_2$ are used to generate a session key $q_b$ by the sender computer.

\* \* \* \* \*